(12) United States Patent
Harada et al.

(10) Patent No.: US 6,440,607 B1
(45) Date of Patent: *Aug. 27, 2002

(54) NICKEL-HYDROGEN SECONDARY CELL

(75) Inventors: Kazuhiko Harada, Maebashi; Kouji Taguchi; Hideharu Suzuki, both of Takasaki, all of (JP)

(73) Assignee: Toshiba Battery Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,293

(22) PCT Filed: Jun. 4, 1999

(86) PCT No.: PCT/JP99/02998

§ 371 (c)(1),
(2), (4) Date: Feb. 8, 2000

(87) PCT Pub. No.: WO99/65095

PCT Pub. Date: Dec. 16, 1999

(30) Foreign Application Priority Data

| Jun. 8, 1998 | (JP) | 10-158894 |
| Jul. 10, 1998 | (JP) | 10-196325 |
| Jul. 14, 1998 | (JP) | 10-199010 |

(51) Int. Cl.[7] .............................................. H01M 8/30
(52) U.S. Cl. ..................... 429/223; 429/217; 429/218.2; 420/900
(58) Field of Search ............................ 429/218.2, 217, 429/223; 420/900

(56) References Cited

U.S. PATENT DOCUMENTS 5,512,385 A * 4/1996 Komori et al. ............. 429/218
5,529,857 A * 6/1996 Nogami et al. .............. 429/59
6,090,506 A * 7/2000 Inoue et al. ................ 429/232
6,270,881 B1 * 8/2001 Yuasa et al. ................ 428/211

FOREIGN PATENT DOCUMENTS

| JP | A61 99278 | 5/1986 |
| JP | A3184275 | 8/1991 |
| JP | A4 34849 | 2/1992 |
| JP | A4262367 | 9/1992 |
| JP | A5225975 | 9/1993 |
| JP | A5242907 | 9/1993 |
| JP | A6310132 | 11/1994 |
| JP | A8321302 | 12/1996 |
| JP | A9 7588 | 1/1997 |
| JP | A9320604 | 12/1997 |
| JP | A10125332 | 5/1998 |

* cited by examiner

*Primary Examiner*—Patrick Ryan
*Assistant Examiner*—Dah-Wei Yuan
(74) *Attorney, Agent, or Firm*—Oblon, Spivak, McClelland, Maier & Neustadt, P.C.

(57) ABSTRACT

A nickel-hydrogen secondary battery has a positive electrode including a positive electrode mixture which contains a nickel compound as a major component and which is supported on a collector sheet, a negative electrode including a negative electrode mixture which contains a hydrogen absorbing alloy as a major component, a binder and an electrically conductive material and which is supported on a collector sheet, the positive and negative electrodes being stacked up alternately or rolled up with a separator interposed therebetween to form an electrode group, and a battery case containing the electrode group together with an electrolyte, the battery case having an opening closed with a sealing plate which is provided with a positive electrode terminal, wherein the binder contains at least carboxylated styrene-butadiene copolymer latex, the conductive material contains metal flakes or short metal fibers, and an edge portion of the collector sheet of the negative electrode is electrically connected to the battery case via a collector plate welded to the edge portion of the collector sheet.

46 Claims, 8 Drawing Sheets

NICKEL-HYDROGEN SECONDARY CELL

This application is the national phase under 35 U.S.C. §371 of PCT International Application No. PCT/JP99/02998 which has an International filing date of Jun. 4, 1999, which designated the United States of America.

TECHNICAL FIELD

The present invention relates to a nickel-hydrogen secondary battery, and more particularly, to a nickel-hydrogen secondary battery which has low internal resistance, which is capable of large current discharge and has improved cycle life, compared with conventional nickel-hydrogen secondary batteries, which can suppress increase in the internal pressure thereof even at the time of quick charge, and which also can supply large current not only at ordinary temperatures but also at low temperatures.

BACKGROUND ART

Various secondary batteries are currently used because of their recharging capability and portability as the power supply for a diversity of applications such as electrically powered tools, electric power-assisted bicycles, and electric vehicles which have recently been developed.

Secondary batteries to be used in these applications are required to have large-current discharge capability, and conventionally nickel-cadmium secondary battery is often used in such applications for the reason stated below.

Namely, nickel-cadmium secondary battery has low internal resistance and provides increased discharge current (large discharge rate) per hour rate, and its battery characteristics are less liable to be deteriorated even if the battery is overcharged or over-discharged.

As the power supply for small-sized electronic devices such as notebook computers or portable telephones, on the other hand, nickel-hydrogen secondary battery, rather than the above nickel-cadmium secondary battery, is widely used for the reason stated below.

Namely, nickel-hydrogen secondary battery, despite its relatively high internal resistance and relatively small discharge rate, has a discharge capacity 1.5 to 2 times as large as that of a nickel-cadmium secondary battery of the same size, and therefore, an electronic device which is driven by a very small current can be driven for a long time even with a small-sized nickel-hydrogen secondary battery.

Nickel-hydrogen secondary battery can be classified into cylindrical type and rectangular parallelepiped type according to shape. The cylindrical type will be outlined below.

The production of positive and negative electrodes will be explained first.

To produce a positive electrode, paste of positive electrode mixture is first prepared by kneading together powder of nickel compound as an active material, such as nickel hydroxide, a binder such as PTFE, a cobalt compound as an electrically conductive material, for example, cobalt oxide or cobalt hydroxide, and water.

A predetermined amount of the paste is then filled, for example, in a spongy, porous metal sheet with a three-dimensional network structure or in an alkali-proof metal sheet (collector sheet) with a porous structure such as a metal fiber mat, dried, and subjected to pressure molding and cutting as needed, to obtain a positive electrode sheet having a predetermined thickness and a predetermined planar shape. In the positive electrode obtained in this manner, therefore, the dried positive electrode mixture is filled in internal voids of the collector sheet and is also supported on the surfaces of same. A small piece of nickel, for example, is attached as a tab terminal to an upper edge portion of the positive electrode.

To produce a negative electrode, on the other hand, paste of negative electrode mixture is prepared first which contains powder of hydrogen absorbing alloy as a major component and which is admixed with a thickener such as carboxymethyl cellulose and an electrically conductive material such as carbon powder.

A predetermined amount of the paste is then applied, for example, to a punched nickel sheet (collector sheet) having a predetermined rate of hole area, dried and subjected to rolling and cutting, to obtain a negative electrode sheet having a predetermined thickness and a predetermined planar shape. Thus, in the negative electrode obtained in this manner, the dried negative electrode mixture is filled in the holes of the collector sheet and is also supported on the surfaces of same.

Like the positive electrode, a tab terminal may be attached as needed to an edge portion of the negative electrode.

Subsequently, using the positive and negative electrodes obtained as described above, an electrode group is formed.

First, as shown in FIG. 1, a separator 3 having liquid retentivity and electrical insulation property, for example, nonwoven polyolefin cloth, is sandwiched between a negative electrode 1, in which the negative electrode mixture is supported on the collector sheet (punched nickel sheet), and a positive electrode 2, in which the positive electrode mixture is supported on the collector sheet (foamed nickel sheet) and a tab terminal 2c is attached to one edge portion thereof, to form a sheet laminate.

With a core placed on the positive electrode 2 of the sheet laminate, the laminate is rolled up in a manner such that the negative electrode 1 is located outside, thereby forming a spiral electrode group having a predetermined outer diameter.

Thus, as shown in FIG. 2, the resulting electrode group A has a sectional structure in which the negative electrode 1 and the positive electrode 2 are alternately arranged with the separator interposed therebetween. The core is thereafter removed, so that a hole 4 is left in the center of the electrode group, and the tab terminal 2c protrudes from an upper end of the of the electrode group.

The electrode group is then inserted into a battery case with a predetermined inner diameter, and after a predetermined alkali electrolyte is poured into the battery case, an upper opening of the battery case is closed with a sealing plate provided with a positive electrode terminal. Since, in this case, the negative electrode 1 of the electrode group comes into contact with the inner wall of the battery case, the battery case serves as a negative electrode terminal. When the electrode group is inserted into the battery case, the tab terminal 2c of the positive electrode 2 is connected to the sealing plate.

In the case of producing a rectangular parallelepiped type secondary battery, an electrode group having a predetermined thickness is formed by stacking negative and positive electrode sheets alternately with a separator interposed therebetween. Accordingly, also in this case, the electrode group has a laminate structure as viewed in section.

While nickel-cadmium secondary battery mentioned above is capable of supplying large current, recently there is a tendency to avoid using nickel-cadmium secondary battery as the power supply for electrically powered tools etc., because cadmium used as its electrode can be harmful to the environment. Attempts have therefore been made to replace nickel-cadmium secondary battery with nickel-hydrogen secondary battery, which is pollution-free and which has higher capacity than nickel-cadmium secondary battery where the batteries are of identical size.

Nickel-hydrogen secondary batteries conventionally available on the market, however, can provide a capacity equivalent to their nominal capacity only when they are discharged at a rate 1 to 3 times the 1-hour rate. Further, this performance is attained only at ordinary temperatures and is not available in a low-temperature environment of, for example, −10° C. or less. For example, if large current discharge is effected at a rate exceeding 5 times the 1-hour rate, the operating voltage greatly drops, and also if nickel-hydrogen secondary battery is used at low temperatures, the operating voltage drastically drops to such an extent that the battery is of no practical use.

Accordingly, although conventional nickel-hydrogen secondary batteries are useful as the power supply for small-sized electronic devices which can be driven by a very small current, they cannot be practically used as a large-current power supply, especially as the power supply for electrically powered tools or electric vehicles that are often used at low temperatures.

Also, in nickel-hydrogen secondary batteries in general, as the charge-discharge cycle is repeated, the capacity of the negative electrode to absorb oxygen gas gradually reduces, with the result that the internal pressure of the battery increases correspondingly. Measures are therefore taken to release the gas inside the nickel-hydrogen secondary battery to the outside of the system through a safety valve incorporated in the battery when the internal pressure of the battery has become greater than a predetermined value.

The problem of increasing internal pressure is noticeable particularly in cases where the battery is used in an environment of relatively high temperature or is charged quickly.

The present invention was created to solve the above problems with conventional nickel-hydrogen secondary batteries, and an object thereof is to provide a nickel-hydrogen secondary battery which permits large current discharge and has improved cycle life, compared with the conventional nickel-hydrogen secondary batteries, which can suppress increase in the internal pressure of the battery even at the time of quick charge, and which also can suppress reduction in the operating voltage even when large current discharge is effected at low temperatures, not to mention ordinary temperatures.

DISCLOSURE OF THE INVENTION

To achieve the above object, the present invention provides a nickel-hydrogen secondary battery comprising: a positive electrode including a positive electrode mixture which contains a nickel compound as a major component and which is supported on a collector sheet; a negative electrode including a negative electrode mixture which contains a hydrogen absorbing alloy as a major component, a binder and an electrically conductive material and which is supported on a collector sheet, the positive electrode and the negative electrode being stacked up alternately or rolled up with a separator interposed therebetween to form an electrode group; and a battery case containing the electrode group together with an electrolyte, the battery case having an opening closed with a sealing plate which is provided with a positive electrode terminal, wherein the binder contains at least carboxylated styrene-butadiene copolymer latex, and the electrically conductive material contains metal flakes or short metal fibers.

In this battery, which is hereinafter referred to as Battery I, the negative electrode mixture contains the aforementioned components, so that large current discharge characteristics at the time of quick discharge can be improved, compared with the conventional nickel-hydrogen secondary batteries.

The present invention also provides a nickel-hydrogen secondary battery comprising: a positive electrode including a positive electrode mixture which contains a nickel compound as a major component and which is supported on a collector sheet; a negative electrode including a negative electrode mixture which contains a hydrogen absorbing alloy as a major component, a binder and an electrically conductive material and which is supported on a collector sheet, the positive electrode and the negative electrode being stacked up alternately or rolled up with a separator interposed therebetween to form an electrode group; and a battery case containing the electrode group together with an electrolyte, the battery case having an opening closed with a sealing plate which is provided with a positive electrode terminal, wherein at least an edge portion of the collector sheet of the negative electrode is electrically connected to the battery case via a collector plate welded to the edge portion of the collector sheet, the binder contains at least carboxylated styrene-butadiene copolymer latex, and the electrically conductive material contains metal flakes or short metal fibers.

In this battery, which is hereinafter referred to as Battery II, not only the large current discharge characteristics are improved by use of the negative electrode mixture of Battery I, but also the use of the collector plate, described in detail later, contributes toward further improving the large current discharge characteristics and also suppressing increase in the internal pressure of the battery at the time of quick charge.

Preferably, in Battery II, that portion of the positive electrode forming the electrode group on which the positive electrode mixture is supported has an area of 30 cm$^2$ or more per theoretical capacity (unit: Ah) of the battery, the collector sheet of the negative electrode comprises a punched metal sheet having no holes at an edge portion thereof, and the collector plate is welded to the non-holed edge portion of the punched metal sheet.

More preferably, in Battery II, at least an edge portion of the collector sheet of the negative electrode is electrically connected to the battery case via the collector plate welded to the edge portion of the collector sheet, and the negative electrode mixture is a dried mixture containing 0.1 to 5.0 parts by weight of carboxylated styrene-butadiene copolymer latex containing 30 to 50 wt % bound butadiene and 60 wt % or more insoluble toluene, 0.05 to 5.0 parts by weight of nickel flakes or short nickel fibers, and 0.05 to 5.0 parts by weight of carbon black, with respect to 100 parts by weight of the hydrogen absorbing alloy powder.

The present invention also provides a battery in which the hydrogen absorbing alloy used in the negative electrode mixture as its major component is surface-treated with acid or alkali. This battery, hereinafter referred to as Battery III, provides the effect of suppressing reduction in the operating voltage even at the time of large current discharge at low temperatures, and by using this negative electrode mixture in the above Batteries I and II, it is possible to further the aforementioned advantages.

The nickel-hydrogen secondary batteries according to the present invention were developed taking the following points into consideration.

(1) Compared with nickel-cadmium secondary battery, nickel-hydrogen secondary battery has large volumetric energy density, and therefore, if these two secondary batteries of identical size are discharged at the same hour rate, the discharge current of the nickel-hydrogen secondary battery is larger than that of the nickel-cadmium secondary battery.

Accordingly, to prevent the operating voltage of the nickel-hydrogen secondary battery from being lowered while the battery is discharged at high discharge rate, it is necessary that the internal resistance of the battery be reduced to as small a value as possible.

In conventional nickel-hydrogen secondary battery, the interface of contact between the negative electrode and the inner wall of the battery case constitutes one conduction path. While the battery supplies a very small current, the contact resistance causes no large voltage drop, but when the discharge current is large, the contact resistance forms a principal cause of reduction of the operating voltage.

To provide a nickel-hydrogen secondary battery permitting large current discharge, therefore, another conduction path with low resistance needs to be incorporated in the battery.

(2) As the opposing area of the positive and negative electrodes of the electrode group is increased, the density of current flowing between the two electrodes decreases, so that reduction in the operating voltage can probably be suppressed.

Accordingly, increasing the opposing area of the positive and negative electrodes, or more basically, increasing the area of that portion of the positive electrode on which the positive electrode active material is supported, is presumably effective in attaining large current discharge.

(3) However, even in the case where the positive electrode of the electrode group has a large area, if the negative electrode mixture forming the counter electrode, that is, the negative electrode, has poor electrical conductivity, for example, the resistance of the electrode group as a whole eventually increases and the internal resistance of the battery is not reduced, making it difficult to attain large current discharge. Also, if the negative electrode mixture has poor electrical conductivity, electron transfer reaction does not progress smoothly inside the negative electrode, so that reduction in the gas absorption capacity is furthered at the time of quick charge, causing an increase in the internal pressure of the battery.

(4) Consequently, increasing the electrical conductivity of the negative electrode mixture means to reduce the resistance of the negative electrode itself, and combination of this point with (1) and (2) above is considered an effective measure to attain large current discharge. Also, increasing the electrical conductivity of the negative electrode mixture may probably contribute at the same time toward suppressing increase in the internal pressure of the battery during quick charge.

(5) Marked reduction in the operating voltage at low temperatures is presumably caused due to loss of surface activity of the hydrogen absorbing alloy powder which forms the negative electrode and which absorbs and releases hydrogen, except for the case where the alkali electrolyte is frozen.

The hydrogen absorbing alloy powder is obtained by crushing an ingot of hydrogen absorbing alloy in an inert atmosphere such as Ar atmosphere, and is used to prepare the aforementioned paste of negative electrode mixture. During the course of such process, the surface activity may presumably be lost.

Accordingly, by activating the surfaces of the particles constituting the hydrogen absorbing alloy powder prior to the preparation of the paste of negative electrode mixture, reduction in the operating voltage of the battery at low temperatures can probably be suppressed. Also, where the paste of negative electrode mixture is prepared using such surface-activated hydrogen absorbing alloy powder, surface oxidation may occur in the process of preparation, and therefore, it is also necessary to suppress such surface oxidation.

The inventors hereof made an intense study of the aforementioned points and developed a nickel-hydrogen secondary battery in which: a collector plate, described in detail later, is incorporated in the battery to solve the problem (1) mentioned above; the area of that portion of the positive electrode of the electrode group on which the positive electrode active material is supported is set to a suitable value, mentioned later, to solve the problem (2); the negative electrode mixture is made up of the components mentioned later, to solve the problems (3) and (4); and the hydrogen absorbing alloy, which is a major component of the negative electrode mixture, is subjected to surface treatment, described in detail later, to solve the problem (5), so that the nickel-hydrogen secondary battery obtained is capable of large current discharge, is improved in cycle life, can suppress increase in the internal pressure of the battery at the time of quick charge, and also can suppress drop in the operating voltage even during large current discharge at low temperatures.

First, Battery I will be described.

FIG. 3 is a partially cutaway perspective view showing an example of Battery I according to the present invention. Battery I is a cylindrical nickel-hydrogen secondary battery in which the electrode group A of FIG. 2, obtained by rolling up a sheet laminate consisting of the negative electrode 1, the separator 3 and the positive electrode 2 in spiral form, is contained directly in a battery case 5 together with an alkali electrolyte (not shown).

A sealing plate 6 having a hole 6a in the center thereof is received in an opening of the battery case 5, and the tab terminal 2c of the electrode group is welded to the central portion of the sealing plate. Also, an electrically insulating gasket 7 having a ring shape is received in the opening of the battery case 5 so that the outer peripheral edge portion of the sealing plate 6 may be forcibly fitted into the gasket by caulking, whereby the opening of the battery case 5 is closed with the sealing plate 6 in an airtight fashion.

A safety valve 8 made of rubber is placed so as to close the hole 6a, and a hat-shaped positive electrode terminal 9 is capped on the safety valve and is welded to the sealing plate 6.

An electrically insulating plate 10 having a hole in the center thereof is placed on the positive electrode terminal 9 such that the terminal 9 projects from the hole, and an enclosure tube 11 is disposed to cover the outer peripheral edge portion of the insulating plate 10 and the outer peripheral surface and bottom of the battery case.

Battery I has a structure wherein the electrode group A is supported directly at the separator 3 on the bottom of the battery case 5 and the outermost portion of the negative electrode 1 of the electrode group A is in contact with the inner wall of the battery case 5. In this battery $C_1$, therefore, charging current and discharge current flow through the following conduction path: positive electrode terminal 9⇆sealing plate 6⇆tab terminal 2c⇆positive electrode 2⇆negative electrode 1⇆inner wall of the battery case 5.

Battery II will be now described.

FIG. 4 is a schematic sectional view showing an example of Battery II according to the present invention. Battery II is a preferred example of battery in which a collector plate, described later, is incorporated, thereby permitting larger current discharge than in the case of Battery I described above and suppressing increase in the internal pressure of the battery at the time of quick charge.

In Battery II, the electrode group A obtained by rolling up a sheet laminate consisting of the negative electrode 1, the separator 3 and the positive electrode 2 in spiral form is contained in the battery case 5 together with an alkali electrolyte, not shown.

A disk-shaped collector plate 12$a$ with a predetermined diameter is welded to the bottom of the battery case 5, and the above electrode group A is arranged on the collector plate 12$a$. Another collector plate 12$b$ having a predetermined diameter is placed on the electrode group A and is connected to a lead 13, described later, which in turn is welded to a sealing plate 6 provided with a positive electrode terminal 9. The sealing plate 6 is fitted in an upper opening of the battery case 5 with a gasket 7 interposed therebetween and the members are tightened by caulking, so that the structure is hermetically sealed.

The collector plates 12$a$ and 12$b$ each serve as a means for reducing the internal resistance of the battery.

In Battery II, it is essential to provide the collector plate 12$a$ at the lower end of the electrode group A, but the collector plate 12$b$ provided at the upper end of the electrode group is not an indispensable member. For example, instead of the collector plate 12$b$ arranged at the upper end of the electrode group A, a plurality of tab terminals may be attached to the upper edge of the positive electrode when the positive electrode is formed. Compared with such tab terminals, however, the collector plate 12$b$ arranged at the upper end of the electrode group A, as shown in FIG. 4, can advantageously lower the internal resistance of the battery and also can facilitate the assembly of the battery.

The negative and positive electrodes 1 and 2 of the electrode group A in the above-described Battery II have the following structures.

In the negative electrode 1, as shown in FIG. 5 and in FIG. 6 which is a sectional view taken along line VI—VI in FIG. 5, one edge portion 1A (in the figures, lower edge portion) of a collector sheet 1$a$, which comprises, for example, a punched metal sheet, has no negative electrode mixture 1$b$ supported thereon, and thus the collector sheet 1$a$ has an exposed strip region at the edge portion 1A. In the positive electrode 2, on the other hand, as shown in FIG. 7 and in FIG. 8 which is a sectional view taken along line VIII—VIII in FIG. 7, one edge portion 2A (in the figures, upper edge portion) of a collector sheet 2$a$, which comprises, for example, a foamed metal sheet, is compressed in the thickness direction into a dense state, and no positive electrode mixture 2$b$ is supported on the edge portion 2A, thus leaving an exposed strip region.

When forming the electrode group A, the negative and positive electrodes 1 and 2 are superposed such that the aforementioned edge portions 1A and 2A are directed in opposite directions, and then are rolled up with the negative electrode 1 located outside.

Accordingly, in the electrode group A obtained in this manner, the spiral edge portion 1A of the negative electrode collector sheet 1$a$ projects from one end (lower end) of the electrode group, and similarly, the spiral edge portion 2A of the positive electrode collector sheet 2$a$ projects from the other end (upper end) of the electrode group.

In inserting the thus-obtained electrode group A in the battery case 5, first, the collector plate 12$a$, described later, is placed on the spiral edge portion 1A of the negative electrode collector sheet 1$a$, and with the collector plate held in contact with the projecting edge portion 1A, the former is welded to the latter at a plurality of contact spots, thereby joining the electrode group A and the collector plate 12$a$ together.

Subsequently, the electrode group A is inserted into the battery case 5 from its welded collector plate 12$a$ so that the collector plate 12$a$ may come into contact with the bottom of the battery case 5. The collector plate 12$a$ and the bottom of the battery case 5 are then held under pressure between an upper welding electrode (not shown) inserted through the hole 4 of the electrode group A and a lower welding electrode (not shown) arranged outside the battery case 5, and a welding current is passed between the two welding electrodes, thereby welding the collector plate 12$a$ to the bottom of the battery case 5.

With the collector plate 12$b$ placed in contact with the edge portion 2A of the positive electrode collector sheet 2$a$, a plurality of contact spots are welded, whereby the electrode group A and the collector plate 12$b$ are joined together.

In the battery of FIG. 4 assembled in this manner, charging current and discharge current flow through the following conduction path: positive electrode terminal 9⇋sealing plate 6⇋lead 13⇋upper collector plate 12$b$⇋edge portion 2A of the positive electrode collector sheet⇋positive electrode 2, negative electrode 1⇋edge portion 1A of the negative electrode collector sheet lower collector plate 12$a$⇋battery case 5.

Part of the charging and discharge currents flow between the positive electrode terminal 9 and the inner wall of the battery case 5, as in the case of Battery I.

The diameters of the collector plates 12$a$ and 12$b$ are smaller than the inner diameter of the battery case 5 so that surfaces thereof can be securely brought into contact with the edge portions 1A and 2A, respectively.

Very small protuberances may be formed on those surfaces of the collector plates 12$a$ and 12$b$ which come into contact with the respective edge portions 1A and 2A of the negative and positive electrode collector sheets. In this case, when the collector plates are brought into contact with or spot-welded to the respective edge portions, the small protuberances fit fast with the edge portions of the collector sheets, whereby the contact resistance to the flow of welding current can be reduced and the strength of the welded spots advantageously increases.

As the material of the collector plates 12$a$ and 12$b$, those materials are selected which are not corroded by alkali electrolyte, have low specific resistance and are available at relatively low cost. For example, pure Ni, stainless steel, and a metal plate plated with Ni are preferred. Provided the inner diameter of the battery case 5 is the same, the larger the thickness of the collector plates 12$a$ and 12$b$, the smaller the conductor resistance as a whole becomes, so that larger current is liable to flow. If, however, the collector plates are too thick, then it leads to increase in the cost and reduction in the battery capacity. Preferably, therefore, the thickness of the collector plates is set to about 0.15 to 2.0 mm.

In cases where the collector plates and the respective edge portions of the collector sheets are joined together by, for example, spot welding, the number of welded spots or welded points constitutes an important factor that determines the extent to which the internal resistance of the battery can be lessened.

For example, where the lower collector plate 12a is welded at four points to the edge portion 1A of the negative electrode collector sheet of the electrode group A, the negative electrode 1 has four welded points B1, B2, B3 and B4 at its edge portion 1A, as shown in the development of FIG. 9. Electron transfer reaction, which is caused by cell reaction induced over the entire surface of the negative electrode 1, is accomplished via these welded points B1, B2, B3 and B4. Namely, the welded points B1, B2, B3 and B4 of the negative electrode 1 shown in FIG. 9 serve just like as four tab terminals attached to same. Accordingly, increasing the number of welded points is equivalent to increasing the number of tab terminals attached to the negative electrode 1, and this means that the negative electrode 1 as a whole shows low resistance to the electron transfer reaction occurring at every region of the negative electrode 1.

Thus, increasing the number of welded points is effective in reducing the apparent resistance of the negative electrode 1 (this is also the case with the positive electrode 2), and accordingly, in lowering the internal resistance of the battery as a whole. If the number of welded points is too large, however, the manufacturing cost increases because as many spot welding operations must be performed on each collector plate during an actual manufacturing process.

In the case of a battery with small discharge capacity, a small number of welded points suffices, but in the case of a battery with larger discharge capacity, the electron transfer reaction of the negative electrode 1 takes place to a greater extent, and it is therefore necessary that the number of welded points be increased correspondingly.

Accordingly, for the Battery II structure, the number of welded points is selected taking account of the capacity of battery to be produced. Specifically, four welded points or more are preferably provided per theoretical capacity (unit: Ah) of the battery.

The collector plates as a whole need to be lower in resistance than the collector sheets, but in order to satisfactorily spot-weld the collector plates to the edge portions of the respective collector sheets, it is necessary that the portions of the collector plates to be welded should be higher in resistance value than the edge portions of the collector sheets. This is because, if the former is lower in resistance value than the latter, welding current does not flow across the contact interface between the two members, making it difficult to form nuggets at the contact interface, that is, making it difficult to perform satisfactory welding. The difficulty can be overcome by forming slits or holes in the collector plates used.

In both Batteries I and II, the negative electrode mixture supported on the collector sheet of the negative electrode 1 comprises a dried mixture obtained by kneading the below-mentioned components together.

The hydrogen absorbing alloy, which is a main component of the negative electrode mixture, may be an alloy such as $LaNi_5$, $MmNi_5$ (Mm is Misch metal) or $LmNi_5$ (Lm is nitrided Misch metal), or may be a multi-element alloy of a type where part of Ni constituting the aforementioned alloy is replaced by at least Al and Mn. Where such a multi-element alloy is used, it may contain, besides Al and Mn, at least one selected from the group consisting of Co, Ti, Cu, Zn, Zr, Cr and B, and in particular, a hydrogen absorbing alloy expressed by the general formula: $LnNi_aCo_bAl_cMn_d$ (where Ln denotes rare earth element, and a, b, c and d are numbers satisfying the relationships $3.30 \leq a \leq 4.50$, $0.50 \leq b \leq 1.10$, $0.20 \leq c \leq 0.50$, $0.05 \leq d \leq 0.20$, and $4.90 \leq a+b+c+d \leq 5.50$) is preferred. More preferably, in the above formula of the hydrogen absorbing alloy, a, b, c and d should satisfy the relationships $3.80 \leq a \leq 4.20$, $0.70 \leq b \leq 0.90$, $0.30 \leq c \leq 0.40$, $0.08 \leq d \leq 0.13$, and $5.00 \leq a+b+c+d \leq 5.20$.

The negative electrode mixture is prepared by kneading together powder of the aforementioned hydrogen absorbing alloy, a hydrophilic polymer, a binder, an electrically conductive material and water, thereby obtaining viscous paste.

The hydrophilic polymer functions as a thickener for the paste, and carboxymethyl cellulose, methyl cellulose, sodium polyacrylate, polyvinyl alcohol, sodium acrylate-vinyl alcohol copolymer, etc. may be used, for example.

In the negative electrode mixture of the present invention, carboxylated styrene-butadiene copolymer latex is used as the binder.

The carboxylated styrene-butadiene copolymer latex used as the binder serves to bind together particles of the powder containing the hydrogen absorbing alloy as a major component and to allow the negative electrode mixture to be bonded to the collector sheet. Also, the carboxylated styrene-butadiene copolymer latex serves to impart hydrophilicity to the whole negative electrode mixture by action of the carboxyl group constituting its end group and thereby to enhance the wettability of the hydrogen absorbing alloy powder, which is a main component of the negative electrode mixture, with respect to alkali electrolyte, whereby the efficiency of cell reaction is increased, thus attaining large current discharge and contributing to improvement in cycle life.

If the mixing ratio in which the carboxylated styrene-butadiene copolymer latex is mixed in the negative electrode mixture is too small, the aforementioned binding capacity is not satisfactorily high, so that the negative electrode mixture drops off from the collector sheet, not only shortening the battery life but causing difficulty in the manufacture of negative electrodes. Also, the aforementioned various functions are not performed satisfactorily. If the mixing ratio is too large, on the other hand, the relative content of the hydrogen absorbing alloy powder in the negative electrode mixture lowers, causing reduction in the capacity of the negative electrode as well as in electrical conductivity of the negative electrode mixture, with the result that the internal pressure of the battery increases. Accordingly, the mixing ratio of the carboxylated styrene-butadiene copolymer latex is preferably set to 0.1 to 5.0 parts by weight, with respect to 100 parts by weight of hydrogen absorbing alloy powder. A more preferred mixing ratio is 0.1 to 2.0 parts by weight.

The carboxylated styrene-butadiene copolymer latex is latex obtained by synthesizing styrene, butadiene and unsaturated ethylene carboxylic acid such as acrylic acid by emulsion polymerization. In the synthesis process, preferably, synthesis conditions are suitably selected such that the resulting latex contains 30 to 50 wt % bound butadiene and 60 wt % or more insoluble toluene.

The reason is as follows. If the content of bound butadiene is smaller than 30 wt %, viscoelasticity is so low that it is difficult to knead bound butadiene uniformly with the other components; if the content of bound butadiene is larger than 50 wt %, sufficient bonding strength is not obtained. In either case, difficulty arises in uniformly kneading bound butadiene with the other components.

If the content of insoluble toluene is smaller than 60 wt %, polymer flow occurs during a heating-drying step following the production of negative electrode, and the surface of the powder containing the hydrogen absorbing alloy as a major component is covered excessively with such polymer, causing rise in overvoltage.

In the negative electrode mixture, metal flakes or short metal fibers are used as the electrically conductive material. Preferably, nickel flakes or short nickel fibers are used.

The metal flakes should preferably have an average diameter of 15 to 20 μm and an average thickness of 1.0 to 1.1 μm. The short metal fibers should preferably have a fiber diameter of 1 to 20 μm, more preferably 1 to 10 μm, and a fiber length of 10 to 200 μm, more preferably 50 to 100 μm.

The aspect ratio, which is the ratio "average diameter/average thickness" in the case of metal flakes and is the ratio "fiber length/fiber diameter" in the case of short metal fibers, should preferably be 10 to 30.

If the flakes or fibers are outside the above dimensional ranges, especially if the flakes or fibers have an excessively large aspect ratio, it is extremely difficult to knead the flakes or fibers uniformly with the hydrogen absorbing alloy powder etc. With flakes or fibers having an aspect ratio falling within the above range, uniform kneading can be carried out smoothly.

Also, when the collector sheet applied with the kneaded paste is subjected to rolling or the like, the metal flakes or short metal fibers mixed in the negative electrode mixture overlap with one another so as to surround the hydrogen absorbing alloy powder and are oriented such that they connect with one another along their lengths. Accordingly, the electrical conductivity of the negative electrode mixture can be further enhanced and, as a consequence, increase in the internal pressure of the battery can be suppressed.

If the mixing ratio in which the metal flakes or short metal fibers are mixed in the negative electrode mixture is too small, the electrical conductivity of the negative electrode mixture lowers, making it difficult to attain large current discharge and to suppress increase in the internal pressure of the battery; conversely, if the mixing ratio is too large, the relative content of the hydrogen absorbing alloy powder in the negative electrode mixture decreases, causing reduction in the capacity of the negative electrode. Accordingly, the mixing ratio of the nickel flakes or short nickel fibers is preferably set to 0.05 to 10.0 parts by weight, more preferably 0.1 to 5.0 parts by weight, with respect to 100 parts by weight of the hydrogen absorbing alloy powder.

The negative electrode mixture may be further admixed with carbon black.

Carbon black contributes to improvement in the electrical conductivity of the negative electrode mixture and also imparts appropriate hydrophobicity to the mixture, so that the carbon black functions as a component for suppressing increase in the internal pressure of the battery.

If the mixing ratio in which carbon black is mixed in the negative electrode mixture is too small, the above effects are not exercised sufficiently; conversely, if the mixing ratio is too large, the relative content of the hydrogen absorbing alloy powder in the negative electrode mixture decreases, causing reduction in the capacity of the negative electrode. Accordingly, the mixing ratio of the carbon black is set to 0.05 to 5.0 parts by weight, with respect to 100 parts by weight of the hydrogen absorbing alloy powder.

To produce the negative electrode, first, the metal flakes or short metal fibers, carbon black, and a suitable amount of hydrophilic polymer such as carboxymethyl cellulose as needed, among the aforementioned components, are kneaded together with water, and carboxylated styrene-butadiene copolymer latex and hydrogen absorbing alloy powder are added to the mixture, thereby preparing paste of negative electrode mixture having a suitable viscosity. The content of water is usually set to 20 to 60 parts by weight, with respect to 100 parts by weight of the hydrogen absorbing alloy powder.

A predetermined amount of the paste is applied to the collector sheet, then dried and rolled to obtain the negative electrode.

In Battery II shown in FIG. 4 in particular, the negative electrode mixture of the negative electrode is preferably obtained by preparing paste of a mixture, which is obtained by kneading 0.1 to 5.0 parts by weight of carboxylated styrene-butadiene copolymer latex containing 30 to 50 wt % bound butadiene and 60 wt % or more insoluble toluene, 0.05 to 5.0 parts by weight of nickel flakes or short nickel fibers, and 0.05 to 5.0 parts by weight of carbon black, with respect to 100 parts by weight of hydrogen absorbing alloy powder, together with water, then applying the paste to the collector sheet, and drying the paste supported on the collector sheet.

In producing Battery III, the hydrogen absorbing alloy which is used to obtain the negative electrode mixture of Battery I or II is subjected to surface treatment described below, to retain surface activity of the hydrogen absorbing alloy.

Specifically, powder obtained by crushing an ingot of hydrogen absorbing alloy is treated with acid or alkali. Owing to this treatment, oxide film etc. adhering to the surfaces of particles of the powder is removed, whereby active surfaces that are suited for absorbing and releasing hydrogen are exposed.

As such acid and alkali, an aqueous solution of HCl and an aqueous solution of KOH, for example, may be used, respectively.

The surface treatment is carried out under the following conditions.

Where an aqueous solution of HCl is used as the acid, the solution used has a concentration of 0.01 to 0.5 N. If the concentration is too low, the surfaces of particles of the powder cannot be sufficiently activated; conversely, if the concentration is too high, the surfaces of the particles are corroded, spoiling the hydrogen absorbing capacity.

Also, if the solution temperature is too low, the surface activation does not progress satisfactorily, and if the solution temperature is too high, the surface of the alloy is corroded and the hydrogen absorbing capacity is lost. Accordingly, the solution temperature is preferably set to 0 to 400° C. Further, if the treating time is too short, the surface activation does not progress sufficiently; conversely, if the treating time is too long, the surface of the alloy is corroded. Therefore, the treating time is preferably set to about 1 to 60 minutes.

In the case where the alkali used is an aqueous solution of KOH, for example, the concentration of the solution, the solution temperature, and the treating time are preferably set to 0.1 to 8.0 N, 40 to 100° C., and 10 to 120 minutes, respectively, for the same reasons as in the case of using an aqueous solution of HCl.

The hydrogen absorbing alloy powder is put in the aforesaid acid or alkali, and the mixture is stirred under the aforementioned conditions. Subsequently, the powder removed from the acid or alkali is washed in water to obtain a material for the paste of negative electrode mixture.

In this case, the acid or alkali may be admixed with a predetermined amount of rare-earth compound so that the rare-earth compound may adhere to the active surfaces of particles of the hydrogen absorbing alloy powder. The rare-earth element adhering to the active surface of the hydrogen absorbing alloy powder serves to prevent the surface of the powder from being deactivated when the paste of negative electrode mixture is prepared. Namely, the rare-earth element retains the activity of the surface of the hydrogen absorbing alloy powder obtained by the treatment using acid or alkali, and thereby suppresses lowering of the operating voltage of the battery at low temperatures.

Rare-earth compounds having such function include $Er_2O_3$, $Y_2O_3$ and $Yb_2O_3$, for example. These compounds may be used singly, or two or more of them may be mixed. Among the compounds named, $Er_2O_3$ is especially preferred.

If the amount of the rare-earth compound added is too small, the aforementioned effects are not exercised satisfactorily and the surface of the alloy powder is oxidized in the process of preparation of the paste of negative electrode mixture, so that the surface activity is lost. On the other hand, if the amount of the rare-earth compound is too large, then it leads not only to saturation of the effects but also to waste of expensive rare-earth compound. Accordingly, the amount of the rare-earth compound is preferably set to 0.1 to 3.0 parts by weight, with respect to 100 parts by weight of the hydrogen absorbing alloy powder to be treated.

The collector sheet, on which the negative electrode mixture described above is supported, is made of nickel, stainless steel, or a metal plated with nickel, and may be a sheet with a porous structure such as network structure, spongy structure, fibrous structure or felt-like structure, a foil, a punched metal sheet having a desired rate of hole area, etc. Among these, a punched metal sheet is preferred in view of strength and cost and also because of its good adhesion to the paste of negative electrode mixture.

In the case of using a punched metal sheet as the collector sheet, the punched metal sheet to be used should preferably be as follows:

In the negative electrode 1 shown in FIGS. 5 and 6, the punched metal sheet 1a used should preferably have no holes at its edge portion 1A. This serves to reduce resistance between points where the punched metal sheet is to be welded to the collector plate 12a.

Even in cases where the edge portion 1A has holes therein, no significant problem arises insofar as the edge portion 1A has a smaller rate of hole area than the other portion on which the negative electrode mixture is supported. Also in this case, resistance between the welding points is relatively small, compared with the other portion on which the negative electrode mixture is supported.

Preferably, using the collector sheet 1a having a non-holed edge portion 1A, the negative electrode mixture 1b is supported on the collector sheet inclusive of the edge portion 1A, the negative electrode mixture adhering to the extreme edge of the lower portion 1A is removed, for example, by grinding so that the lower edge alone may be exposed, and the collector plate 12a is welded to the exposed lower edge.

The negative electrode obtained in this manner has large capacity, compared with the negative electrode shown in FIG. 5, because the negative electrode mixture 1b is supported also on the non-holed edge portion 1A.

After the negative electrode mixture is supported on the entire surface of the collector sheet inclusive of the non-holed edge portion, part of the non-holed edge portion may be removed by cutting, and in this case, the edge of the collector sheet can be exposed with ease, which advantageously facilitates the manufacture.

The positive electrode 2 of the electrode group A will be now described.

The positive electrode 2 may be either sintered type or paste type, but the paste type is preferred because a larger amount of positive electrode mixture can be supported, permitting increase in the capacity of the battery.

The positive electrode mixture to be supported on the paste type positive electrode is prepared as follows:

An active material serving as a main component and comprised of nickel hydroxide powder alone or comprised of powder that is obtained by coprecipitating nickel hydroxide and Zn, Co, Bi or Cu is admixed with an electrically conductive material and a binder. The amount of the active material is determined in relation to the theoretical capacity of the battery to be produced, and the amounts of the conductive material and binder are adjusted accordingly.

The active material obtained by the latter powder (obtained by coprecipitation) is preferred since the battery assembled using such active material has increased charging efficiency at high temperatures. The nickel hydroxide used as the active material should preferably have a half value width of $0.8°/2\theta$(Cu—K$\alpha$) or more, more particularly 0.9 to $1.0°/2\theta$(Cu—K$\alpha$), at its (101) face as measured by X-ray powder diffractometry, because the coefficient of use and life of the battery can be improved.

As the electrically conductive material, one or more kinds of powder selected from the group of cobalt compounds and metallic cobalt are used. Such cobalt compounds include cobalt hydroxide and cobalt monoxide, for example. Cobalt hydroxide or cobalt monoxide or a mixture of the two is especially preferred because the coefficient of use of the positive electrode can be increased.

The binder to be used may be carboxymethyl cellulose, methyl cellulose, sodium polyacrylate, polyvinyl alcohol, vinyl alcohol-sodium acrylate copolymer, or polytetrafluoroethylene, for example.

The collector sheet, on which the positive electrode mixture of the aforementioned composition is supported, is made of nickel, stainless steel, or a metal plated with nickel, and may be a sheet with a porous structure such as network structure, spongy structure, fibrous structure or felt-like structure.

In the case of Battery II as well as Battery III, the opposing area of the positive and negative electrodes 2 and 1 of the electrode group A should preferably be increased to thereby reduce the internal resistance of the battery. Specifically, the area of that portion of the positive electrode 2 on which the active material is supported is increased.

This permits reduction in the current density even at large current attributable to high discharge rate, and moreover, in the case of Battery II, for example, also because of the internal resistance reducing effect achieved by the use of the aforementioned collector plates, large-current discharge can be attained.

Specifically, the area of the rolled positive electrode 2 of the electrode group A is preferably set to 30 $cm^2$ or more per theoretical capacity (CT: Ah) of the battery to be produced, that is, to 30 $cm^2$Ah or more. More preferably, the area of the positive electrode is set to 38 $cm^2$ /Ah or more.

If the area of the positive electrode is smaller than 30 $cm^2$/Ah, reduction in the operating voltage of the battery occurs during large current discharge not only at low temperatures but also at ordinary temperatures.

To increase the area of the positive electrode 2, the thickness of the positive electrode 2 may be reduced provided the outer diameter and height of the electrode group A, for example, are fixed. In this case, the rolled positive electrode 2 of the electrode group A is increased in length; as a consequence, the number of layers of the rolled positive electrode of the electrode group A increases and thus the active material-supporting area of the positive electrode increases as a whole. If, however, the thickness is too small, the strength of the positive electrode lowers and the electrode may be broken or cracked when rolled up, increasing the number of defective electrode groups A. Accordingly, the upper limit on the thickness is preferably set so that the active material-supporting area of the positive electrode may be restricted to a maximum of 100 $cm^2/Ah$.

EXAMPLES 1–3 & Comparative Examples 1–2

Figure 3:
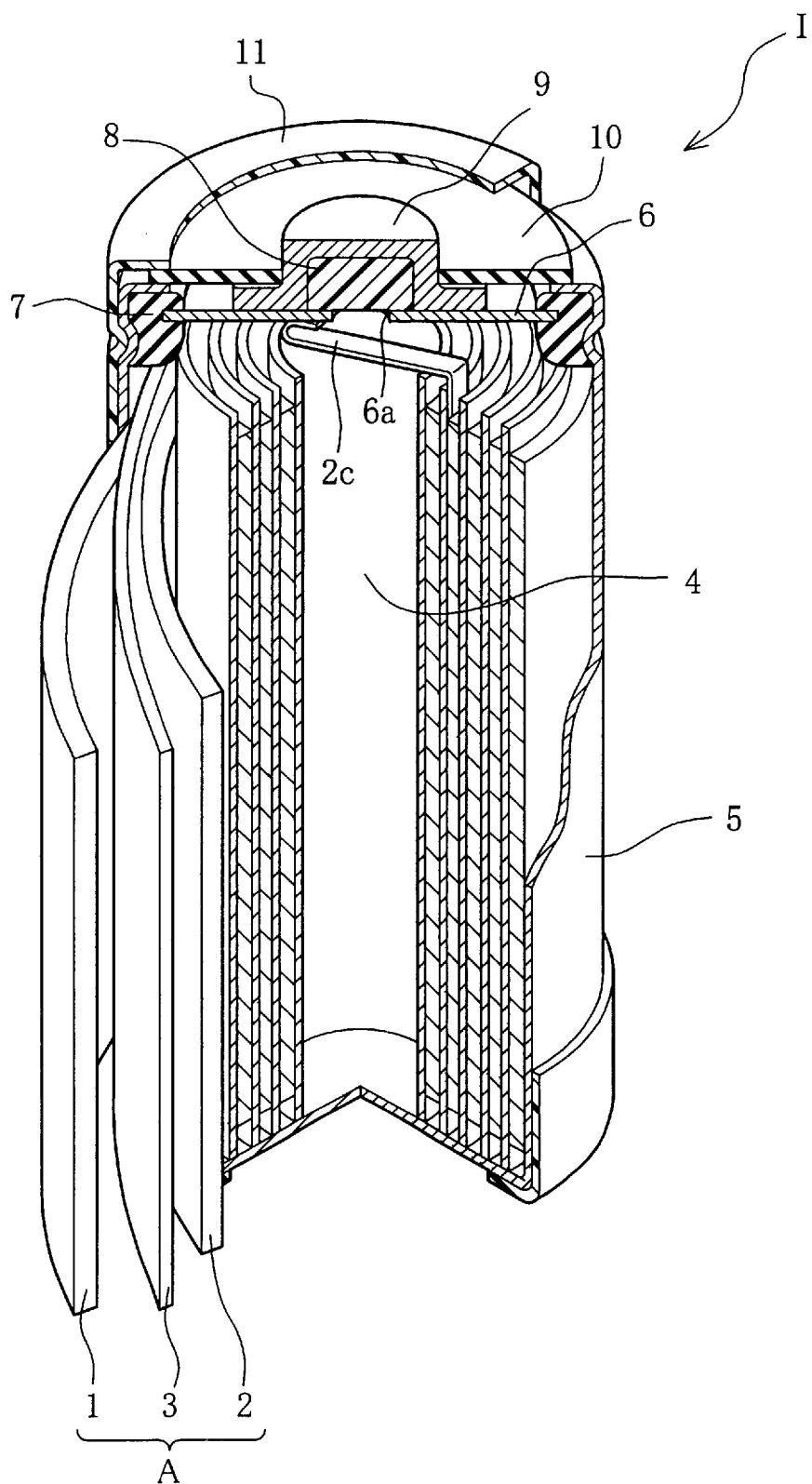
FIG. 3 is a partially cutaway perspective view exemplifying a battery $C_1$ according to the present invention.

Batteries I as shown in FIG. 3 were assembled following the procedure described below.

(1) Production of Negative Electrodes

First, a hydrogen absorbing alloy having the composition $MmNi_{4.0}Co_{0.4}Mn_{0.3}Al_{0.3}$ was mechanically crushed to obtain alloy powder with an average particle size of 37 μm.

Pastes of negative electrode mixture were prepared by kneading the alloy powder together with other components shown in Table 1 below in respective ratios also shown in the table, and were individually applied to a punched nickel sheet (thickness: 0.06 mm) having holes of 1 mm in diameter cut therein and a rate of hole area of 45%. The punched nickel sheets with the respective pastes applied thereon were dried at a temperature of 80° C. for one hour and then rolled to obtain negative electrodes shown in

TABLE 1

The obtained negative electrodes had a thickness of 0.25 mm.

| | Negative electrode $C_1$ | Negative electrode $C_2$ | Negative electrode $C_3$ | Negative electrode $C_4$ | Negative electrode $C_5$ |
|---|---|---|---|---|---|
| Components used to prepare paste of negative electrode mixture and their mixing ratio | | | | | |
| Hydrogen absorbing alloy (parts by weight) | 100 | 100 | 100 | 100 | 100 |
| Sodium polyacrylate (parts by weight) | 0.5 | 0.5 | 0.5 | 0.5 | 0.5 |
| Carboxymethyl cellulose (parts by weight) | 0.12 | 0.12 | 0.12 | 0.12 | 0.12 |
| Carboxylated styrenebutadiene copolymer latex Composition (*1) | | | | | |
| Bound butadiene content (wt %) | 40 | 40 | 40 | PTFE dispersion (specific gravity: 1.5; solid content: 60 wt %) | 40 |
| Insoluble toluene content (wt %) | 70 | 70 | 70 | | 70 |
| Quantity (parts by weight) | 0.5 (*2) | 0.5 (*2) | 0.5 (*2) | 1.0 (*2) | 0.5 (*2) |
| Conductive material | | | | | |
| Nickel flakes (*3) | | | | | |
| Average size (μm) | (*4) | — | — | — | — |
| Average thickness (μm) | 1.0 | — | 1.0 | 1.0 | — |
| Aspect ratio | | — | | — | |
| Quantity (parts by weight) | 1.0 | — | 0.5 | 1.0 | — |
| Short nickel fibers | | | | | |
| Fiber diameter (μm) | — | 5.0 | — | — | — |
| Fiber length (μm) | — | 100 | — | — | — |
| Aspect ratio | — | 20 | — | — | — |
| Quantity (parts by weight) | — | 1.0 | — | — | — |

TABLE 1-continued

The obtained negative electrodes had a thickness of 0.25 mm.

|  | Negative electrode $C_1$ | Negative electrode $C_2$ | Negative electrode $C_3$ | Negative electrode $C_4$ | Negative electrode $C_5$ |
| --- | --- | --- | --- | --- | --- |
| Carbon black | — | — | 0.5 | — | 1.0 |
| Distilled water (parts by weight) | 50 | 50 | 50 | 50 | 50 |

*1: Solid content: 50 wt %.
*2: Quantity in terms of solid content.
*3: NOVAMET HCA-1 (trade name, manufactured by INCO LIMITED).
*4: Value measured by air settling method as provided by ASTM B293.

(2) Production of Positive Electrodes

Paste of positive electrode mixture was prepared by admixing 11 parts by weight of cobalt monoxide powder, 0.33 wt % of carboxymethyl cellulose, 0.56 parts by weight of PTFE dispersion (specific gravity: 1.5; solid content: 60 wt %), and 50 parts by weight of water, with respect to 100 parts by weight of nickel hydroxide powder, and then kneading the mixture.

The paste was filled in nickel-plated foamed sheets and was also applied to both sides of each sheet. The sheets were then rolled to obtain positive electrodes with a thickness of 0.35 mm. The amount of the paste applied to each sheet was adjusted such that the area per theoretical capacity of the battery was 38 cm²/Ah.

(3) Assembling of Batteries

Figure 1:
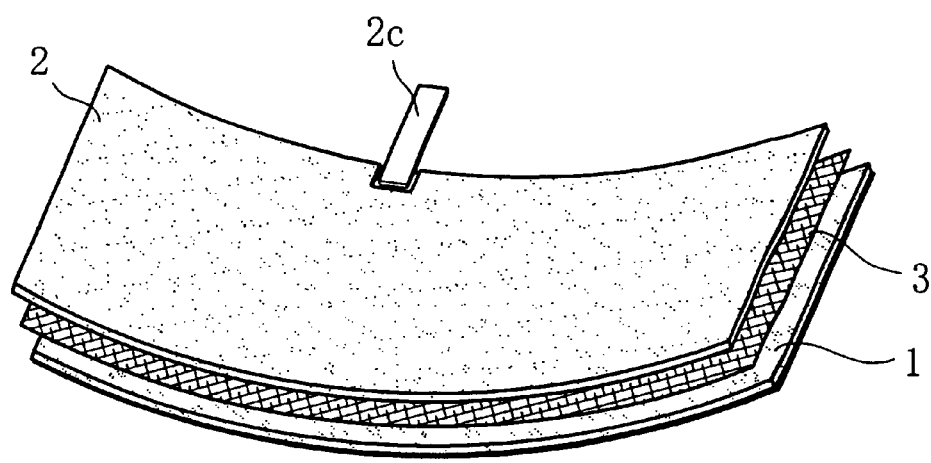
FIG. 1 is a perspective view showing a state in which a negative electrode, a separator, and a positive electrode are overlapped one upon another.
Figure 2:
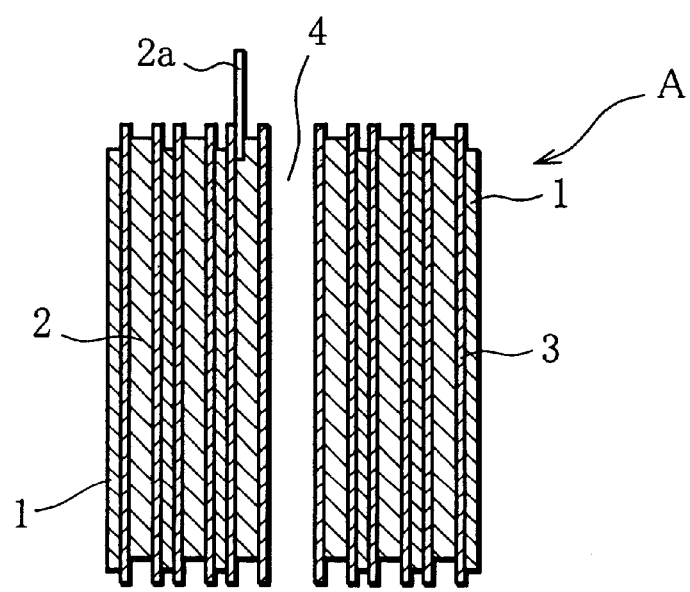
FIG. 2 is a sectional view showing a sectional structure of a conventional electrode group.

A sheet laminate was formed by interposing a separator of hydrophilic nonwoven polyolefin cloth between each of the negative electrodes shown in Table 1 and each positive electrode obtained as above, and was rolled up such that the negative electrode was located outside, thereby obtaining electrode groups A as shown in FIG. 2.

The electrode groups A were then contained in respective A-size battery cases. After an electrolyte consisting of an aqueous solution containing 7 N of potassium hydroxide and an aqueous solution containing 1 N of lithium hydroxide was poured into the individual battery cases, the cases were sealed and cylindrical nickel-hydrogen secondary batteries having a nominal capacity of 1700 mAh were assembled.

(4) Characteristics of Batteries

Each battery was charged up to 150% at a current of 1 C and was discharged at 20 A to a level such that the final voltage was 0.7 V, and in the process intermediate discharge potential and discharge capacity were measured.

Also, a charge-discharge cycle consisting of 150% charging at 1 C and discharging at 1C to a final voltage of 0.7 V was repeated at a temperature of 25° C., and the number of cycles repeated until the discharge capacity decreased to 80% or less of the initial value was counted. The results are shown in Table 2 below.

TABLE 2

|  | Negative electrode incorporated | Intermediate operating voltage (V) during discharge at 20 A | Discharge capacity (mAh) during discharge at 20 A | No. of cycles (times) |
| --- | --- | --- | --- | --- |
| Battery of Example 1 | Negative electrode $C_1$ | 1.00 | 1690 | 500 |
| Battery of Example 2 | Negative electrode $C_2$ | 1.00 | 1690 | 500 |
| Battery of Example 3 | Negative electrode $C_3$ | 1.00 | 1690 | 500 |
| Battery of Comparative Example 1 | Negative electrode $C_4$ | 0.90 | 500 | 150 |
| Battery of Comparative Example 2 | Negative electrode $C_5$ | 0.85 | 200 | 200 |

As is clear from Tables 1 and 2, compared with the batteries of the comparative examples, Batteries I (Examples 1 to 3) of the present invention show no reduction in operating voltage even during large current discharge and also are remarkably improved in discharge capacity and cycle life.

EXAMPLES 4–8

Negative electrodes were produced in the same manner as the negative electrode $C_1$ shown in Table 1 except that the mixing ratio of nickel flakes was varied as shown in Table 3 below.

Using these negative electrodes, nickel-hydrogen secondary batteries were assembled in the same manner as in Examples 1 to 3, and intermediate discharge potential, discharge capacity and the number of cycles were measured by the same method as used in Examples 1 to 3 to evaluate their characteristics. The results are shown in Table 3.

TABLE 3

|  | Mixing ratio (parts by weight) of nickel flakes used to produce negative electrode $C_1$ | Intermediate operating voltage (V) during discharge at 20 A | Discharge capacity (mAh) during discharge at 20 A | No. of cycles (times |
| --- | --- | --- | --- | --- |
| Battery of Example 4 | 0.01 | 0.90 | 1500 | 400 |
| Battery of Example 5 | 0.05 | 1.00 | 1690 | 500 |
| Battery of Example 6 | 5.0 | 1.10 | 1690 | 500 |
| Battery of Example 7 | 10.0 | 1.00 | 1690 | 300 |

TABLE 3-continued

|  | Mixing ratio (parts by weight) of nickel flakes used to produce negative electrode $C_1$ | Intermediate operating voltage (V) during discharge at 20 A | Discharge capacity (mAh) during discharge at 20 A | No. of cycles (times |
|---|---|---|---|---|
| Battery of Example 8 | 20.0 | 1.00 | 1690 | 300 |

Table 3 reveals that if the mixing ratio of nickel flakes is too small, reduction in the operating voltage, discharge capacity and cycle life occurs. On the other hand, if the mixing ratio is increased, reduction in the operating voltage at the time of large current discharge is suppressed and also the discharge capacity improves; however, the cycle life begins to deteriorate. Accordingly, the mixing ratio of nickel flakes should preferably be within a range of 0.05 to 5.0 parts by weight, with respect to 100 parts by weight of the hydrogen absorbing alloy.

EXAMPLES 9–13

Negative electrodes were produced in the same manner as the negative electrode $C_1$ shown in Table 1 except that the mixing ratio of carboxylated styrene-butadiene copolymer latex was varied as shown in Table 4 below.

Using these negative electrodes, nickel-hydrogen secondary batteries were assembled in the same manner as in Examples 1 to 3, and intermediate discharge potential, discharge capacity and the number of cycles were measured by the same method as used in Examples 1 to 3 to evaluate their characteristics. The results are shown in Table 4.

TABLE 4

|  | Mixing ratio (parts by weight) of carboxylated styrene-butadiene copolymer latex used to produce negative electrode $C_1$ | Intermediate operating voltage (V) during discharge at 20 A | Discharge capacity (mAh) during discharge at 20 A | No. of cycles (times |
|---|---|---|---|---|
| Battery of Example 9 | 0.05 | 0.90 | 1500 | 300 |
| Battery of Example 10 | 0.1 | 0.98 | 1670 | 500 |
| Battery of Example 11 | 1.0 | 1.05 | 1690 | 500 |

TABLE 4-continued

|  | Mixing ratio (parts by weight) of carboxylated styrene-butadiene copolymer latex used to produce negative electrode $C_1$ | Intermediate operating voltage (V) during discharge at 20 A | Discharge capacity (mAh) during discharge at 20 A | No. of cycles (times |
|---|---|---|---|---|
| Battery of Example 12 | 5.0 | 1.10 | 1695 | 500 |
| Battery of Example 13 | 10.0 | 1.05 | 1690 | 400 |

As is clear from Table 4, if the mixing ratio of carboxylated styrene-butadiene copolymer latex is reduced, the operating voltage during large current discharge lowers, and also reduction in the discharge capacity and cycle life occurs. On the other hand, if the mixing ratio is increased, reduction in the operating voltage and discharge capacity is suppressed, but the cycle life is deteriorated. Accordingly, the mixing ratio of carboxylated styrene-butadiene copolymer latex should preferably be within a range of 0.1 to 5.0 parts by weight, with respect to 100 parts by weight of the hydrogen absorbing alloy.

EXAMPLE 14

Figure 4:
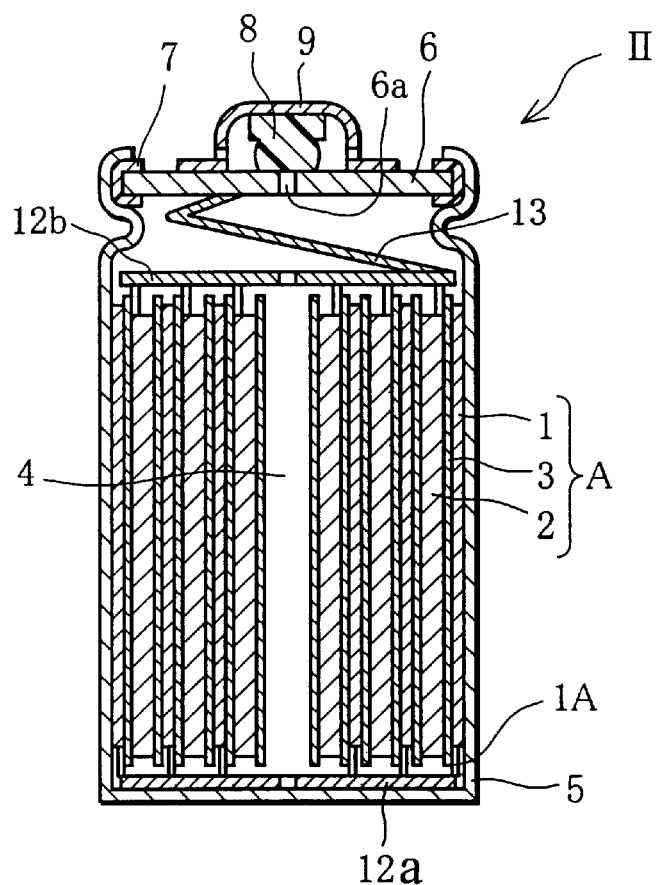
FIG. 4 is a schematic sectional view exemplifying another battery $C_2$ according to the present invention.
Figure 6:
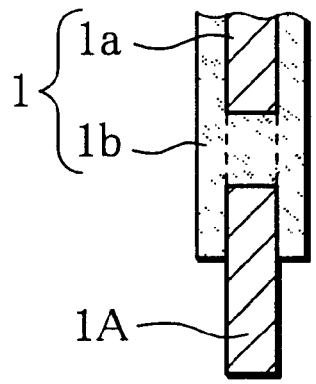
FIG. 6 is a sectional view taken along line VI—VI in FIG. 5.

Batteries II as shown in FIG. 4 were produced in the following manner.
(1) Production of Negative Electrodes Pastes of negative electrode mixture were prepared by kneading components shown in Tables 5 to 7 below in respective ratios also shown in the tables, and were individually applied to a punched nickel sheet (thickness: 0.06 mm) having holes of 1 mm in diameter cut therein and a rate of hole area of 45%. The punched nickel sheets with the respective pastes applied thereon were dried at a temperature of 80° C. for one hour and then rolled to obtain negative electrodes shown in Tables 5 to 7. Subsequently, the dried mixture adhering to the edge of each negative electrode was removed, so that the edge 1A of 2 mm wide was exposed as shown in FIG. 6.

Also, the pastes used to produce the respective negative electrodes shown in Tables 5 to 7 were individually applied to a PET film of 100 μm thick, dried and rolled to obtain coating films of 10 μm thick. These coating films were measured as to electrical conductivity by the method as provided by JIS K6911. The results are also shown in Tables 5 to 7.

TABLE 5

|  | Negative electrode $C_6$ | Negative electrode $C_7$ | Negative electrode $C_8$ | Negative electrode $C_9$ | Negative electrode $C_{10}$ | Negative electrode $C_{11}$ |
|---|---|---|---|---|---|---|
| Components used to prepare paste of negative electrode mixture and their mixing ratio | | | | | | |
| Hydrogen absorbing alloy (parts by weight) | 100 | 100 | 100 | 100 | 100 | 100 |
| Sodium polyacrylate (parts by weight) | 0.5 | 0.5 | 0.5 | 0.5 | 0.5 | 0.5 |
| Carboxymethyl cellulose (parts by weight) | 0.12 | 0.12 | 0.12 | 0.12 | 0.12 | 0.12 |
| Carboxylated styrenebutadiene copolymer latex Composition (*1) | | | | | | |
| Bound butadiene content (wt %) | 40 | 40 | 40 | 40 | 30 | 50 |
| Insoluble toluene content (wt %) | 60 | 60 | 60 | 60 | 60 | 60 |

TABLE 5-continued

|  | Negative electrode $C_6$ | Negative electrode $C_7$ | Negative electrode $C_8$ | Negative electrode $C_9$ | Negative electrode $C_{10}$ | Negative electrode $C_{11}$ |
|---|---|---|---|---|---|---|
| Quantity (parts by weight) | 1.0(*2) | 1.0 (*2) | 1.0 (*2) | 1.0(*2) | 1.0(*2) | 1.0(*2) |
| Conductive material |  |  |  |  |  |  |
| Nickel flakes (*3) |  |  |  |  |  |  |
| Average size (μm) |  |  |  |  |  |  |
| Average thickness (μm) |  |  |  |  |  |  |
| Aspect ratio | 20 | 20 | 20 | 20 | 20 | 20 |
| Quantity (parts by weight) | 1.0 | 3.0 | 5.0 | 0.5 | 1.0 | 1.0 |
| Carbon black (parts by weight) | 1.0 | 0.05 | 0.05 | 5.0 | 1.0 | 1.0 |
| Distilled water (parts by weight) | 50 | 50 | 50 | 50 | 50 | 50 |
| Conductivity (S/cm) of paste coating film | 10 | 13 | 15 | 10 | 10 | 10 |

*1: Solid content: 50 wt %.
*2: Quantity in terms of solid content.
*3: NOVAMET HCA-1 (trade name, manufactured by INCO LIMITED).

TABLE 6

|  | Negative electrode $C_{12}$ | Negative electrode $C_{13}$ | Negative electrode $C_{14}$ | Negative electrode $C_{15}$ | Negative electrode $C_{16}$ | Negative electrode $C_{17}$ |
|---|---|---|---|---|---|---|
| Components used to prepare paste of negative electrode mixture and their mixing ratio |  |  |  |  |  |  |
| Hydrogen absorbing alloy (parts by weight) | 100 | 100 | 100 | 100 | 100 | 100 |
| Sodium polyacrylate (parts by weight) | 0.5 | 0.5 | 0.5 | 0.5 | 0.5 | 0.5 |
| Carboxymethyl cellulose (parts by weight) | 0.12 | 0.12 | 0.12 | 0.12 | 0.12 | 0.12 |
| Carboxylated styrenebutadiene copolymer latex Composition (*1) |  |  |  |  |  |  |
| Bound butadiene content (wt %) | 40 | 40 | 40 | 40 | 50 | 10 |
| Insoluble toluene content (wt %) | 60 | 60 | 60 | 60 | 30 | 30 |
| Quantity (parts by weight) | 1.0 (*2) | 1.0 (*2) | 1.0 (*2) | 1.0 (*2) | 1.0 (*2) | 1.0 (*2) |
| Conductive material |  |  |  |  |  |  |
| Nickel flakes (*3) |  |  |  |  |  |  |
| Average size (μm) |  |  |  |  |  |  |
| Average thickness (μm) |  |  |  |  |  |  |
| Aspect ratio | — | 20 | 20 | 20 | 20 | 20 |
| Quantity (parts by weight) | — | 10 | 1.0 | 1.0 | 1.0 | 1.0 |
| Carbon black (parts by weight) | 1.0 | 1.0 | 10 | — | 1.0 | 1.0 |
| Distilled water (parts by weight) | 50 | 50 | 50 | 50 | 50 | 50 |
| Conductivity (S/cm) of paste coating film | 5 | 1 | 1 | 1 | 1 | 1 |

*1: Solid content: 50 wt %.
*2: Quantity in terms of solid content.
*3: NOVAMET HCA-1 (trade name, manufactured by INCO LIMITED).

TABLE 7

|  | Negative electrode $C_{18}$ | Negative electrode $C_{19}$ | Negative electrode $C_{20}$ | Negative electrode $C_{21}$ |
|---|---|---|---|---|
| Components used to prepare paste of negative electrode mixture and their mixing ratio |  |  |  |  |
| Hydrogen absorbing alloy (parts by weight) | 100 | 100 | 100 | 100 |
| Sodium polyacrylate (parts by weight) | 0.5 | 0.5 | 0.5 | 0.5 |
| Carboxymethyl cellulose (parts by weight) | 0.12 | 0.12 | 0.12 | 0.12 |
| Carboxylated styrenebutadiene copolymer latex Composition (*1) |  |  |  |  |
| Bound butadiene content (wt %) | 60 | 50 | PTFE | Styrene- |
| Insoluble toluene content (wt %) | 30 | 30 | dispersion | butadiene |

TABLE 7-continued

|  | Negative electrode $C_{18}$ | Negative electrode $C_{19}$ | Negative electrode $C_{20}$ | Negative electrode $C_{21}$ |
|---|---|---|---|---|
|  |  |  | (specific gravity: 1.5; solid content: 60 wt %) | rubber |
| Quantity (parts by weight) | 1.0(*2) | 7.0(*2) | 1.0(*2) | 1.0(*2) |
| Conductive material | | | | |
| Nickel flakes (*3) | | | | |
| Average size (μm) | — | | | |
| Average thickness (μm) | — | | | |
| Aspect ratio | 20 | 20 | 20 | 20 |
| Quantity (parts by weight) | 1.0 | 1.0 | 1.0 | 1.0 |
| Carbon black (parts by weight) | 1.0 | 1.0 | 1.0 | 1.0 |
| Distilled water (parts by weight) | 50 | 50 | 50 | 50 |
| Conductivity (S/cm) of paste coating film | 1 | 1 | 1 | 1 |

(2) Production of Positive Electrodes

Figure 7:
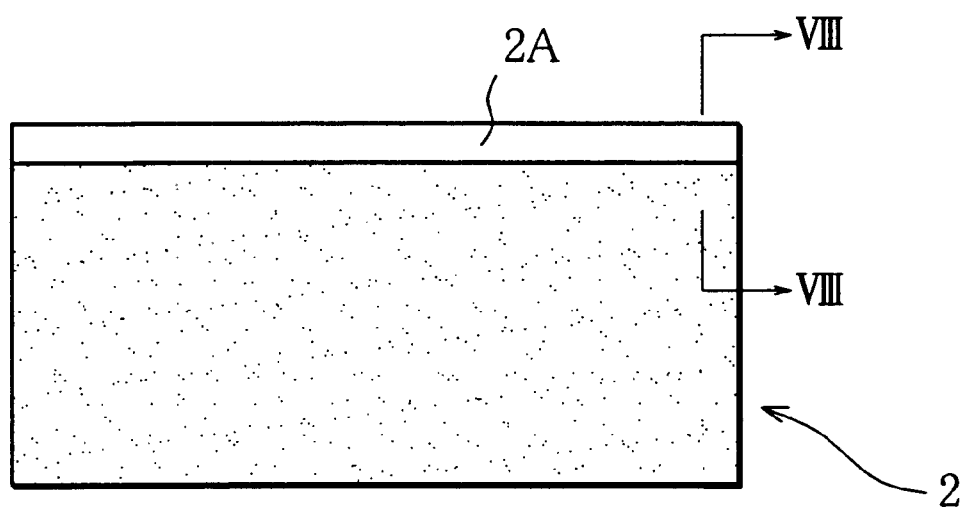
FIG. 7 is a plan view showing an example of a positive electrode.
Figure 8:
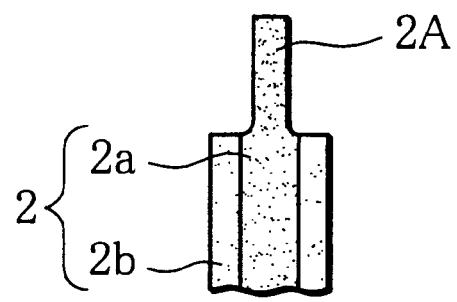
FIG. 8 is a sectional view taken along line VIII—VIII in FIG. 7.
Figure 9:
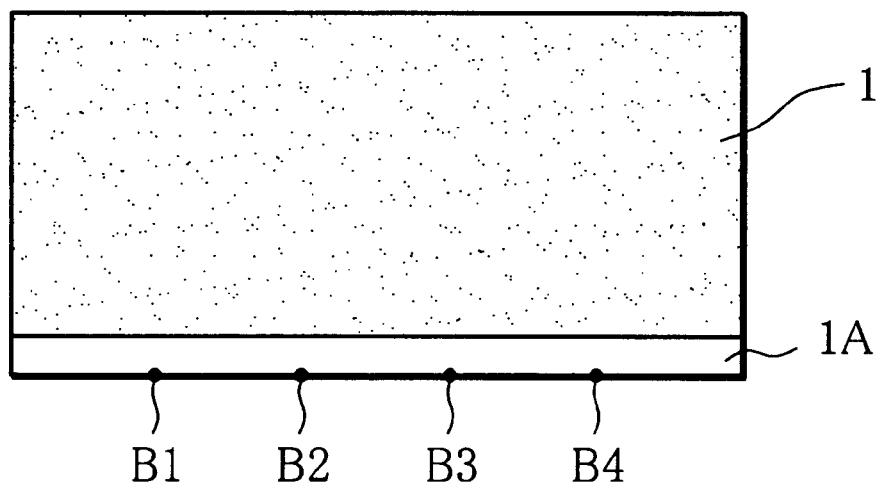
FIG. 9 is a development of the negative electrode to which a collector plate is spot-welded.

Foamed Ni sheets were prepared as the collector sheets 2a, and an upper edge portion of 2 mm wide of each sheet was compressed in the length direction into a dense state, to form the edge portion 2A as shown in FIGS. 7 and 8. The thickness of the edge portion 2A was reduced to ⅕ of the thickness of the foamed Ni sheet.

Paste 2b of positive electrode mixture containing nickel hydroxide powder as a main component was filled in each foamed Ni sheet except for the edge portion 2A. The sheets were dried at a temperature of 100° C. for one hour and then rolled to obtain positive electrodes 2 as shown in FIG. 7.

(3) Assembling of Batteries

Using the negative electrodes $C_6$ and $C_{15}$ as the negative electrode, sheet laminates were formed by interposing a separator made of nonwoven polyolefin cloth of 0.12 mm thick between each of the negative electrodes and the positive electrode obtained as above, and were rolled up using a core of 4 mm in diameter such that the negative electrode was located outside. The core was then removed, thereby obtaining two types of electrode groups having an outer diameter of 16 mm.

Subsequently, using these electrode groups, batteries having two different types of structure as stated below were assembled.

Structure I: This structure (shown in FIG. 4) was obtained in the following manner. With a collector plate 12a of nickel with a diameter of 15 mm held in contact with the edge portion 1A of each electrode group, the former was spot-welded to the latter at 20 points, thereby joining the two members together. Each electrode group A was then inserted into the battery case 5 from its welded collector plate 12a such that the collector plate 12a came into contact with the bottom of the battery case, followed by welding of the collector plate to the bottom of the case. After an alkali electrolyte consisting of an aqueous solution containing 7 N of KOH and an aqueous solution containing 1 N of LiOH was poured into the battery case 5, a collector plate 12b of nickel with a diameter of 15 mm was placed on the electrode group A and welded thereto at 20 points. A lead 13 made of nickel was then welded to the collector plate 12b as well as to the sealing plate 6. The batteries obtained are nickel-hydrogen secondary batteries having a nominal capacity of 1700 mAh.

Structure II: In this structure, no collector plate was arranged at the upper or lower end of each electrode group and the electrode group was simply contained in the battery case 5 together with the aforementioned electrolyte.

Among the thus-obtained batteries, a battery (hereinafter referred to as battery $D_1$) using the negative electrode $C_6$ and having the structure I and a battery (hereinafter referred to as battery $D_2$) using the negative electrode $C_{15}$ and having the structure I belong to Battery II, and a battery (hereinafter referred to as battery $D_3$) using the negative electrode $C_6$ and having the structure II and a battery (hereinafter referred to as battery $D_4$) using the negative electrode $C_{15}$ and having the structure II belong to Battery I.

Figure 10:
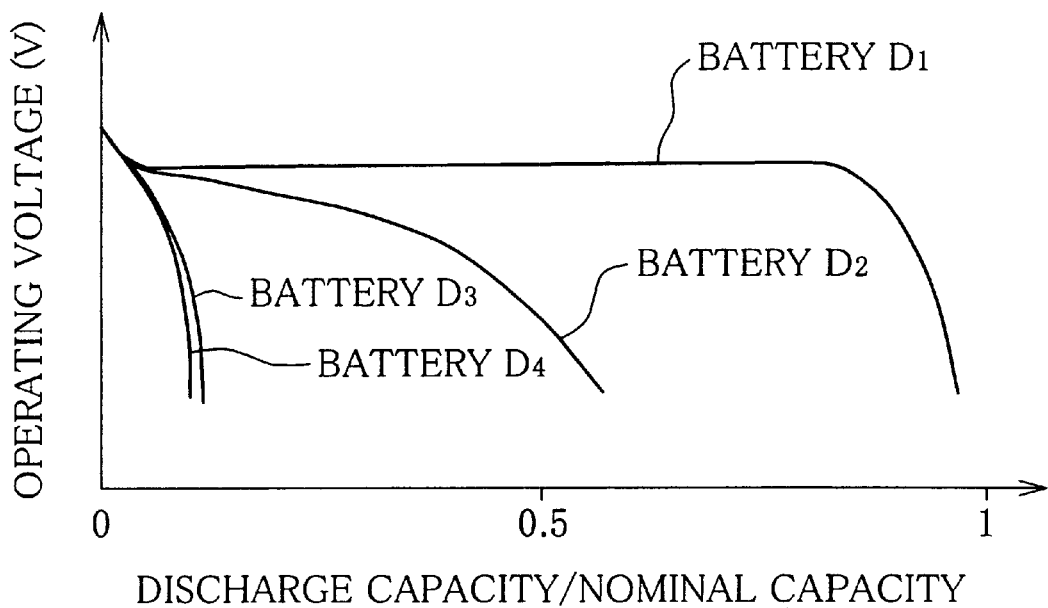
FIG. 10 is a graph showing the relationships between discharge capacity/nominal capacity and operating voltage.

These four types of battery were individually charged at room temperature up to 150% at 1-hour rate current and then discharged at a constant current of 20 A until the final voltage became equal to 0.8 V, and in the process the operating voltages of the individual batteries were measured. FIG. 10 shows the results in terms of the relationship between discharge capacity/nominal capacity and operating voltage.

Also, when each of the aforementioned batteries was assembled, an internal pressure measurement sensor was incorporated in the battery case 5. Each battery was charged at 3400 mA for 0.7 hours at a temperature of 25° C., and the internal pressure of the battery was measured. The results are shown in Table 8 below.

TABLE 8

|  | Measured internal pressure (kg/cm²) |
|---|---|
| Battery $D_1$ | 5 |
| Battery $D_2$ | 5 |
| Battery $D_3$ | 18 |
| Battery $D_4$ | 18 |

FIG. 10 and Table 8 reveal the following.

(1) The battery $D_1$, which incorporates therein the negative electrode $C_6$ obtained by using a high-conductivity negative electrode mixture and which has the structure I wherein the collector plates are welded to the electrode group, is greatly improved in its large-current discharge characteristics, compared with the other batteries, and also increase in the internal pressure of the battery during quick charge is significantly suppressed.

(2) As is clear from the comparison between the batteries $D_1$ and $D_3$, the battery $D_1$ having the structure I is much superior to the battery $D_3$ having the structure II in respect of the large-current discharge characteristics and the effect of suppressing increase in the internal pressure of the battery, though the negative electrodes incorporated are the same. From this it follows that the battery structure presumably has a greater influence upon the characteristics.

Accordingly, the influence of the battery structure upon the above characteristics was examined.

(1) Using the negative electrodes $C_7$, $C_8$, $C_9$, $C_{13}$ and $C_{14}$ shown in Tables 5 to 7, batteries having the structure II were assembled.

These batteries incorporating the negative electrodes $C_7$, $C_8$, $C_9$, $C_{13}$ and $C_{14}$ therein are respectively referred to as batteries $D_5$, $D_6$, $D_7$, $D_8$ and $D_9$.

Figure 11:
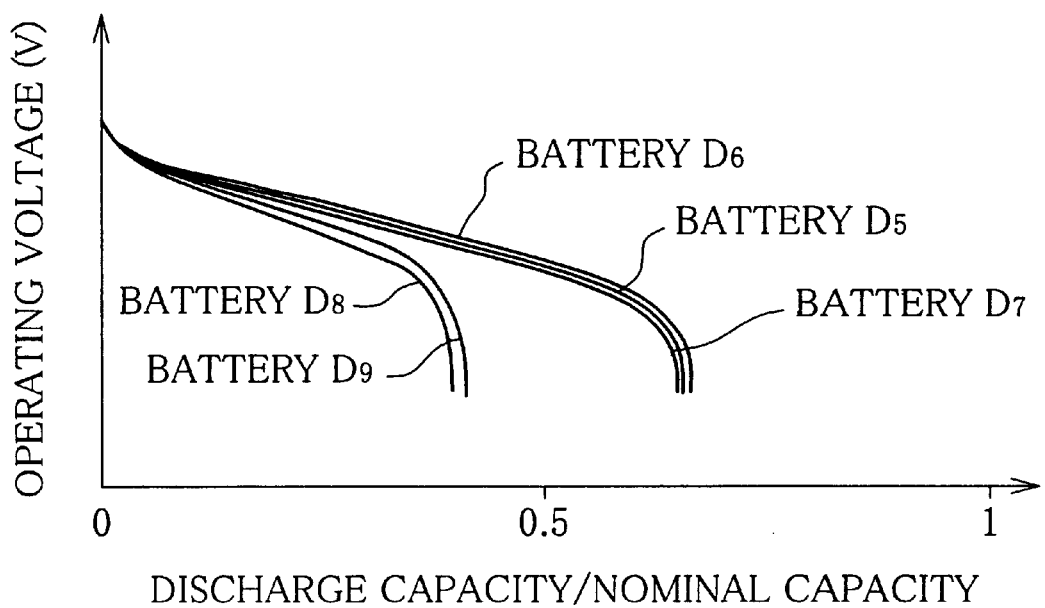
FIG. 11 is a graph also showing the relationships between discharge capacity/nominal capacity and operating voltage.

The large-current discharge characteristics of these batteries were measured, the results being shown in FIG. 11.

As is clear from FIG. 11, compared with the battery $D_1$ having the structure I, the batteries having the structure II show considerable deterioration in the large-current discharge characteristics. Even in such batteries, those incorporating therein the negative electrodes prepared using pastes of high-conductivity negative electrode mixture have improved characteristics, compared with those incorporating therein the negative electrodes prepared using pastes of low-conductivity negative electrode mixture.

(2) Using the negative electrodes $C_{10}$, $C_{11}$, $C_{16}$, $C_{17}$, $C_{18}$ and $C_{19}$ shown in Tables 5 to 7, batteries having the structure II were assembled.

These batteries incorporating the negative electrodes $C_{10}$, $C_{11}$, $C_{16}$, $C_{17}$, $C_{18}$ and $C_{19}$ therein are respectively referred to as batteries $D_{10}$, $D_{11}$, $D_{12}$, $D_{13}$, $D_{14}$ and $D_{15}$.

The large-current discharge characteristics of these batteries were examined. The results are shown in FIG. 12.

Figure 12:
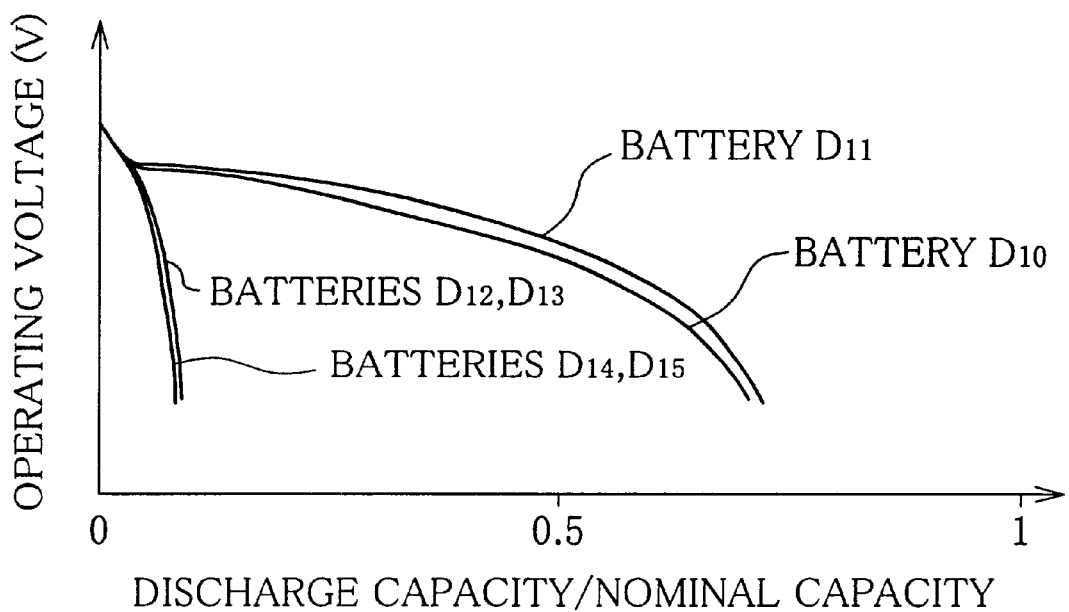
FIG. 12 is a graph similarly showing the relationships between discharge capacity/nominal capacity and operating voltage.

As is clear from FIG. 12, compared with the battery $D_1$ having the structure I, the batteries having the structure II show considerable deterioration in the large-current discharge characteristics. Even in such batteries, those incorporating therein the negative electrodes prepared using pastes of high-conductivity negative electrode mixture have improved characteristics, compared with those incorporating therein the negative electrodes prepared using pastes of low-conductivity negative electrode mixture.

Accordingly, it is apparent that the use of the battery structure I, that is, providing the electrode group with collector plates, is effective in improving the large-current discharge characteristics and also suppressing increase in the internal pressure of the battery.

Thus, Battery II according to the present invention has high capacity and is also capable of large current discharge which is not attained with conventional nickel-hydrogen secondary batteries, that is, a discharge at more than five times the 1-hour rate. Further, increase in the internal pressure of the battery during quick charge can be significantly suppressed.

The battery is therefore very high in its industrial value as a power supply for electrically powered tools or electric vehicles.

EXAMPLE 15

Using Battery II having the structure I, Batteries III were produced in the following manner.
(1) Production of Negative Electrodes Hydrogen absorbing alloy powder (average particle size: 35 μm) having the composition $LmNi_{4.35}Co_{0.40}Mn_{0.29}Al_{0.30}$ (Lm denotes La-enriched Misch metal) was prepared.

Treated powder A was prepared by putting 500 g of the alloy powder in an aqueous solution (solution temperature: 80° C.) containing 8 N of KOH, stirring the mixture for 30 minutes, washing the powder removed from the solution sufficiently in water, and drying the powder in an Ar atmosphere at a temperature of 80° C.

Treated powder B was prepared by putting 500 g of the alloy powder and 5 g of $Er_2O_3$ powder in an aqueous solution (solution temperature: 80° C.) containing 8 N of KOH, stirring the mixture for 30 minutes, washing the powder mixture removed from the solution sufficiently in water, and drying the powder mixture in an Ar atmosphere at a temperature of 80° C.

Treated powder C was prepared by putting 500 g of the alloy powder in an aqueous solution (solution temperature: 20° C.; pH: 1) containing 0.5 N of HCl, stirring the mixture for 30 minutes, washing the powder removed from the solution sufficiently in water, and drying the powder in an Ar atmosphere at a temperature of 80° C.

Treated powder D was prepared by putting 500 g of the alloy powder and 5 g of $Er_2O_3$ powder in an aqueous solution (solution temperature: 80° C.; pH: 1) containing 0.5 N of HCl, stirring the mixture for 30 minutes, washing the powder mixture removed from the solution sufficiently in water, and drying the powder mixture in an Ar atmosphere at a temperature of 80° C.

With respect to 100 parts by weight of each of the four types of treated powder, 0.3 parts by weight of sodium acrylate-vinyl alcohol copolymer, 1.0 part by weight of carboxylated styrene-butadiene copolymer latex (bound butadiene content: 40 wt %; insoluble toluene content: 60 wt %), 1 part by weight of carbon black, and 1 part by weight of nickel flakes (NOVAMET HCA-1; average thickness: 1 μm; aspect ratio: 20:1) were mixed. Each of the mixtures was admixed with 50 parts by weight of water and then stirred, thereby preparing four types of paste of negative electrode mixture.

The pastes thus prepared were individually applied to a punched nickel sheet, dried at a temperature of 80° C. for 0.5 hours, and then rolled. Subsequently, the dried paste adhering to the lower edge portion 1A of each sheet, shown in FIG. 5, was removed to obtain four types of negative electrode.

The negative electrodes on which the treated powders A, B, C and D are supported are respectively referred to as negative electrodes a, b, c and d.

For the purpose of comparison, using the untreated alloy powder, paste of negative electrode mixture was prepared under the same conditions, and negative electrodes e were produced using the paste.

(2) Production of Positive Electrodes

With respect to 100 parts by weight of nickel hydroxide powder, 11 parts by weight of cobalt monoxide powder, 0.33 parts by weight of carboxymethyl cellulose, 0.56 parts by weight of PTFE dispersion (specific gravity: 1.5; solid content: 60 wt %), and 50 parts by weight of water were mixed, and the components were kneaded together to prepare paste of positive electrode mixture.

The paste was filled in base plates made of nickel-plated fibers and was also applied to both sides of each plate. The plates with the paste thereon were then dried and rolled to obtain positive electrodes.

In this case, the amount of the paste of positive electrode mixture filled in the base plate or the thickness of the paste applied to the base plate was varied such that the total amount of the mixture was the same, to obtain positive electrodes having different areas, 20 $cm^2Ah$ and 30 $cm^2Ah$, per theoretical capacity of the battery.

The former is referred to as positive electrode I, and the latter as positive electrode II.

(3) Assembling of Batteries

Cylindrical nickel-hydrogen secondary batteries of 4/5 A size, as shown in FIG. 4, were assembled in the following manner.

Figure 5:
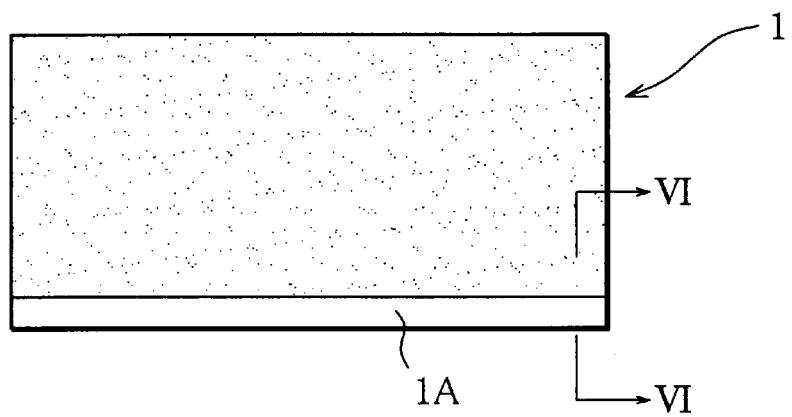
FIG. 5 is a plan view showing an example of a negative electrode.

First, pairs of positive and negative electrodes were prepared as shown in Table 9 below, and a sheet laminate was formed by interposing a separator of hydrophilic non-woven polyolefin cloth between each pair of electrodes and was rolled up such that the negative electrode was located outside, thereby obtaining electrode groups A as shown in FIG. 5.

With the lower end 1A of each electrode group A and a collector plate 12a of nickel held in contact with each other under pressure, the two were spot-welded together at 20 points to form a one-piece body.

Subsequently, each electrode group A was inserted into the battery case 5 from its welded collector plate 12a such that the collector plate 12a came into contact with the bottom of the battery case. The collector plate 12a and the bottom of the battery case 5 were then held under pressure between an upper welding electrode (not shown) inserted through the hole 4 of the electrode group A and a lower welding electrode (not shown) arranged outside the battery case 5, and a welding current was passed between the two welding electrodes, thereby welding the collector plate 12a to the bottom of the battery case 5. Then, an electrolyte containing 7 N of KOH and 1 N of LiOH as its main components was poured into the battery case 5.

Then, a collector plate 12b of Ni was placed on each electrode group A and spot-welded thereto at 20 points, and a lead 13 of Ni was welded to the collector plate 12b as well as to the sealing plate 6. The sealing plate 6 was then fitted into the upper opening of the battery case 5 with the gasket 7 interposed therebetween, and the entire structure was tightened by caulking, thereby assembling the battery.

TABLE 9

| | Combination of positive and negative electrodes in electrode group A | |
|---|---|---|
| | Type of positive electrode | Type of negative electrode |
| Battery $D_{16}$ | Positive electrode II | Negative electrode a |
| Battery $D_{17}$ | Positive electrode II | Negative electrode b |
| Battery $D_{18}$ | Positive electrode II | Negative electrode c |
| Battery $D_{19}$ | Positive electrode II | Negative electrode d |
| Battery $D_{20}$ | Positive electrode I | Negative electrode e |
| Battery $D_{21}$ | Positive electrode II | Negative electrode e |
| Battery $D_{22}$ | Positive electrode I | Negative electrode a |
| Battery $D_{23}$ | Positive electrode I | Negative electrode b |
| Battery $D_{24}$ | Positive electrode I | Negative electrode c |
| Battery $D_{25}$ | Positive electrode I | Negative electrode d |

(4) Characteristics of Batteries

The characteristics of each battery were examined following the procedure stated below.

(i) The battery was charged at the 1-hour rate for 1.2 hours at room temperature, and after being left at rest for 30 minutes, it was discharged at a current equal to the 1-hour rate at a temperature of −10° C.;

(ii) The battery was charged at the 1-hour rate for 1.2 hours at room temperature, and after being left at rest for 30 minutes, it was discharged at a current three times the 1-hour rate at a temperature of −10° C.;

(iii) The battery was charged at the 1-hour rate for 1.2 hours at room temperature, and after being left at rest 15 for 30 minutes, it was discharged at a current five times the 1-hour rate at a temperature of −10° C.;

(iv) The battery was charged at the 1-hour rate for 1.2 hours at room temperature, and after being left at rest for 30 minutes, it was discharged at a current ten times the 1-hour rate at a temperature of −10° C. In each of the above cycles, the discharge capacity was measured until the operating voltage of the battery became equal to 1000 mV.

Also, after each of the charge-discharge cycles (i) to (iv), the batteries were discharged at a current equal to the 1-hour rate until the battery voltage became equal to 1000 mV such that the capacity became equal to the residual capacity found before the start of the charging.

Figure 13:
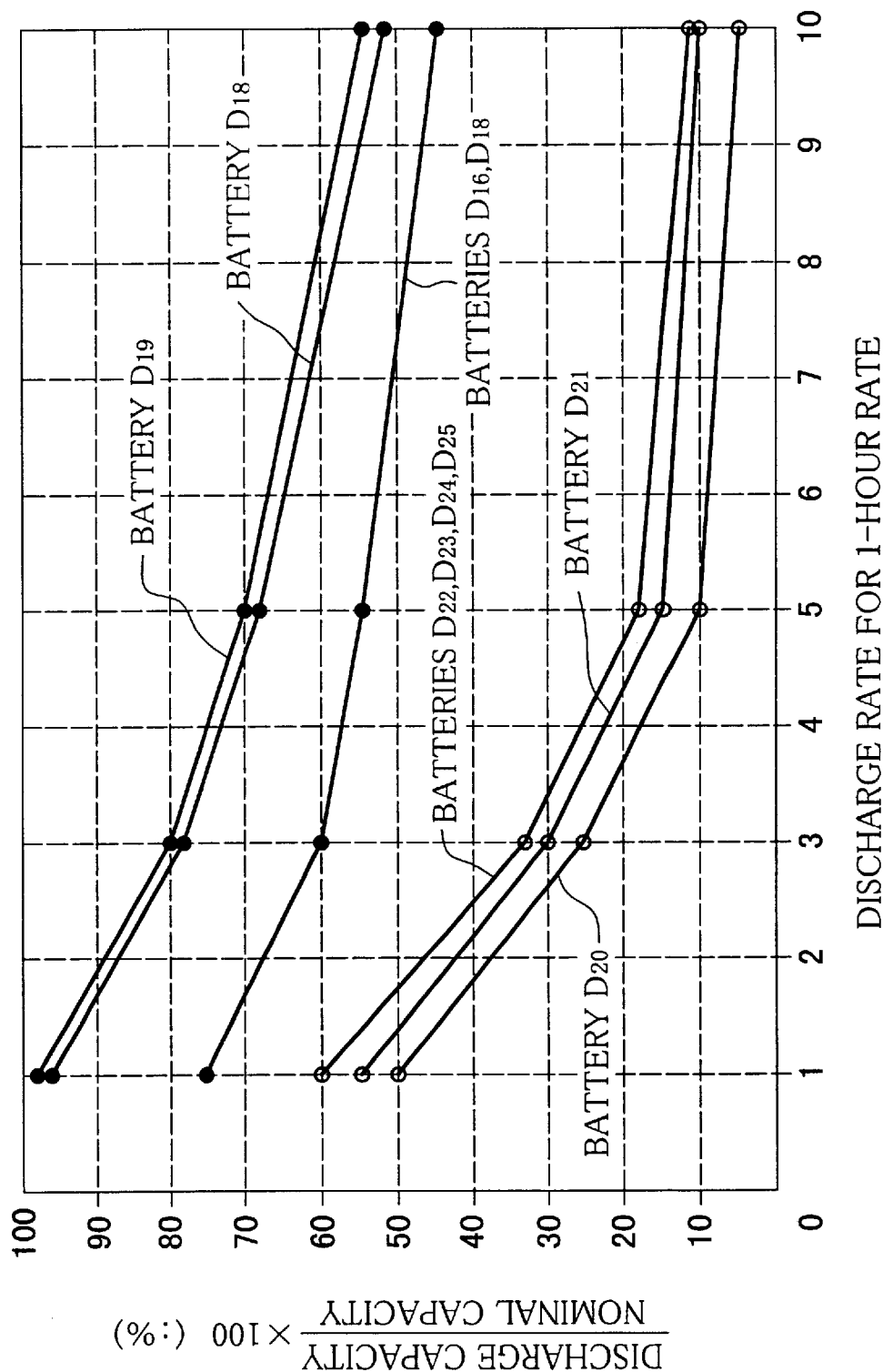
FIG. 13 is a graph showing the relationships between discharge rate and discharge capacity.

The results are shown in FIG. 13 in terms of the relationship between discharge rate and discharge capacity.

FIG. 13 reveals the following.

(1) The batteries $D_{16}$ to $D_{19}$, which use the combination of the positive electrode II having the positive electrode mixture supported on an area of 30 cm²Ah thereof and the negative electrode a, b, c or d of which the hydrogen absorbing alloy powder has been treated with acid or alkali, are capable of large current discharge even at temperatures as low as −10° C., compared with the batteries $D_{20}$ to $D_{25}$ which do not satisfy one or both of these requirements.

Compared with the battery $D_{20}$ which is equivalent to the conventional nickel-hydrogen secondary battery in particular, these batteries exhibit remarkably improved discharge characteristics at low temperatures.

(2) Comparing the batteries $D_{17}$ and $D_{19}$ with the batteries $D_{16}$ and $D_{18}$ clearly shows that the former are superior in discharge characteristics at low temperatures. This manifests the effect of $Er_2O_3$ which was admixed when the hydrogen absorbing alloy powder was surface-treated.

Thus, Battery III using the surface-treated hydrogen absorbing alloy is capable of large current discharge that is not attained with conventional nickel-hydrogen secondary batteries. Especially, the battery ensures large current discharge even at low temperatures.

Accordingly, the battery has high industrial value as a power supply for electrically powered tools or electric vehicles which are used not only at ordinary temperatures but also at low temperatures.

Industrial Applicability

The nickel-hydrogen secondary battery according to the present invention has high capacity, is capable of large current discharge that is not attained with conventional nickel-hydrogen secondary batteries, and has improved cycle life with respect to large current discharge. Also, increase in the internal pressure of the battery during quick charge is suppressed, and large current discharge is available even at low temperatures. Accordingly, the battery of the present invention is useful as a power supply for various electrically powered tools, electric power-assisted bicycles, electric vehicles, etc.

What is claimed is:

1. A nickel-hydrogen secondary battery comprising:
    a positive electrode including a positive electrode mixture which contains a nickel compound as a major component and which is supported on a first collector sheet;
    a negative electrode including a negative electrode mixture which contains a hydrogen absorbing alloy as a major component, a binder and an electrically conductive material which is supported on a second collector sheet, said positive electrode and said negative electrode being stacked up alternately or rolled up with a separator interposed therebetween to form an electrode group; and
    a battery case containing the electrode group together with an electrolyte, said battery case having an opening closed with a sealing plate which is provided with a positive electrode terminal, wherein the binder contains at least carboxylated styrene-butadiene copolymer latex, and the electrically conductive material contains metal flakes or short metal fibers, wherein the hydrogen absorbing alloy is surface-treated with acid or alkali, and wherein a compound of rare-earth element adheres to at least part of a surface of the hydrogen absorbing alloy.

2. The nickel-hydrogen secondary battery according to claim 1, wherein the metal flakes comprise nickel flakes, and the short metal fibers comprise short nickel fibers.

3. The nickel-hydrogen secondary battery according to claim 1, wherein the carboxylated styrene-butadiene copolymer latex has a content of 0.1 to 5 parts by weight with respect to 100 parts by weight of the hydrogen absorbing alloy.

4. The nickel-hydrogen secondary battery according to claim 1, wherein the metal flakes or the short metal fibers have a content of 0.05 to 5.0 parts by weight with respect to 100 parts by weight of the hydrogen absorbing alloy.

5. The nickel-hydrogen secondary battery according to claim 1, wherein the compound of rare-earth element is $Er_2O_3$.

6. The nickel-hydrogen secondary battery according to claim 1, wherein the metal flakes or the short metal fibers overlap with each other to surround the hydrogen absorbing alloy powder and to have an orientation such that the metal flakes or the short metal fibers connect with each other along their lengths.

7. The nickel-hydrogen secondary battery according to claim 1, wherein the electrically conductive material accounts for between 10% and 30% parts by weight of the negative electrode.

8. The nickel-hydrogen secondary battery according to claim 1, wherein the carboxylated styrene-butadiene copolymer latex is obtained by synthesizing styrene, butadiene and unsaturated ethylene carboxylic acid by emulsion polymerization.

9. A nickel-hydrogen secondary battery comprising:

a positive electrode including a positive electrode mixture which contains a nickel compound as a major component and which is supported on a first collector sheet;

a negative electrode including a negative electrode mixture which contains a hydrogen absorbing alloy as a major component, a binder and an electrically conductive material which is supported on a second collector sheet, said positive electrode and said negative electrode being stacked up alternately or rolled up with a separator interposed therebetween to form an electrode group; and a battery case containing the electrode group together with an electrolyte, said battery case having an opening closed with a sealing plate which is provided with a positive electrode terminal, wherein the binder contains at least carboxylated styrene-butadiene copolymer latex, and the electrically conductive material contains metal flakes or short metal fibers, and wherein the metal flakes or the short metal fibers overlap with each other to surround the hydrogen absorbing alloy powder and to have an orientation such that the metal flakes or the short metal fibers connect with each other along their lengths.

10. The nickel-hydrogen secondary battery according to claim 9, wherein the metal flakes comprise nickel flakes, and the short metal fibers comprise short nickel fibers.

11. The nickel-hydrogen secondary battery according to claim 9, wherein the carboxylated styrene-butadiene copolymer latex has a content of 0.1 to 5 parts by weight with respect to 100 parts by weight of the hydrogen absorbing alloy.

12. The nickel-hydrogen secondary battery according to claim 9, wherein the metal flakes or the short metal fibers have a content of 0.05 to 5.0 parts by weight with respect to 100 parts by weight of the hydrogen absorbing alloy.

13. The nickel-hydrogen secondary battery according to claim 9, wherein the hydrogen absorbing alloy is surface-treated with acid or alkali.

14. The nickel-hydrogen secondary battery according to claim 9, wherein the electrically conductive material accounts for between 10% and 30% parts by weight of the negative electrode.

15. The nickel-hydrogen secondary battery according to claim 9, wherein the carboxylated styrene-butadiene copolymer latex is obtained by synthesizing styrene, butadiene, and unsaturated ethylene carboxylic acid by emulsion polymerization.

16. A nickel-hydrogen secondary battery comprising:

a positive electrode including a positive electrode mixture which contains a nickel compound as a major component and which is supported on a first collector sheet;

a negative electrode including a negative electrode mixture which contains a hydrogen absorbing alloy as a major component, a binder and an electrically conductive material which is supported on a second collector sheet, said positive electrode and said negative electrode being stacked up alternately or rolled up with a separator interposed therebetween to form an electrode group; and a battery case containing the electrode group together with an electrolyte, said battery case having an opening closed with a sealing plate which is provided with a positive electrode terminal, wherein at least an edge portion of the second collector sheet of said negative electrode is electrically connected to said battery case via a collector plate welded to the edge portion of the second collector sheet, wherein the binder contains at least carboxylated styrene-butadiene copolymer latex, and the electrically conductive material contains metal flakes or short metal fibers, and wherein a portion of said positive electrode forming the electrode group on which the positive electrode mixture is supported has an area of 30 $cm^2$ or more per theoretical capacity (unit: Ah) of the battery.

17. The nickel-hydrogen secondary battery according to claim 16, wherein the metal flakes comprise nickel flakes, and the short metal fibers comprise short nickel fibers.

18. The nickel-hydrogen secondary battery according to claim 16, wherein the carboxylated styrene-butadiene copolymer latex has a content of 0.1 to 5 parts by weight with respect to 100 parts by weight of the hydrogen absorbing alloy.

19. The nickel-hydrogen secondary battery according to claim 16, wherein the metal flakes or the short metal fibers have a content of 0.05 to 5.0 parts by weight with respect to 100 parts by weight of the hydrogen absorbing alloy.

20. The nickel-hydrogen secondary battery according to claim 16, wherein the collector sheet of said negative electrode comprises a punched metal sheet having no holes at an edge portion thereof, and the collector plate is welded to the non-holed edge portion of the punched metal sheet.

21. The nickel-hydrogen secondary battery according to claim 16, wherein the hydrogen absorbing alloy is surface-treated with acid or alkali.

22. The nickel-hydrogen secondary battery according to claim 21, wherein a compound of rare-earth element adheres to at least part of a surface of the hydrogen absorbing alloy.

23. The nickel-hydrogen secondary battery according to claim 22, wherein the compound of rare-earth element is $Er_2O_3$.

24. The nickel-hydrogen secondary battery according to claim 16, wherein the negative electrode mixture is a dried mixture containing 0.1 to 5.0 parts by weight of carboxylated styrene-butadiene copolymer latex containing 30 to 50 wt % bound butadiene and 60 wt % or more insoluble toluene, 0.05 to 5.0 parts by weight of nickel flakes of short nickel fibers, and 0.05 to 5.0 parts by weight of carbon black, with respect to 100 parts by weight of the hydrogen absorbing alloy.

25. The nickel-hydrogen secondary battery according to claim 16, wherein the metal flakes or the short metal fibers overlap with each other to surround the hydrogen absorbing alloy powder and to have an orientation such that the metal flakes or the short metal fibers connect with each other along their length.

26. The nickel-hydrogen secondary battery according to claim 16, wherein the electrically conductive material accounts for between 10% and 30% parts by weight of the negative electrode.

27. The nickel-hydrogen secondary battery according to claim 16, wherein the carboxylated styrene-butadiene copolymer latex is obtained by synthesizing styrene, butadiene and unsaturated ethylene carboxylic acid by emulsion polymerization.

28. A nickel-hydrogen secondary battery comprising:
a positive electrode including a positive electrode mixture which contains a nickel compound as a major component and which is supported on a first collector sheet;
a negative electrode including a negative electrode mixture which contains a hydrogen absorbing alloy as a major component, a binder and an electrically conductive material which is supported on a second collector sheet, said positive electrode and said negative electrode being stacked up alternately or rolled up with a separator interposed therebetween to form an electrode group; and
a battery case containing the electrode group together with an electrolyte, said battery case having an opening closed with a sealing plate which is provided with a positive electrode terminal,
wherein at least an edge portion of the second collector sheet is electrically connected to said battery case via a collector plate welded to the edge portion of the second collector sheet,
wherein the binder contains at least carboxylated styrene-butadiene copolymer latex, and the electrically conductive material contains metal flakes or short metal fibers,
wherein the hydrogen absorbing alloy is surface-treated with acid or alkali, and
wherein a compound of rare-earth element adheres to at least part of a surface of the hydrogen absorbing alloy.

29. The nickel-hydrogen secondary battery according to claim 28, wherein the metal flakes comprise nickel flakes, and the short metal fibers comprise short nickel fibers.

30. The nickel-hydrogen secondary battery according to claim 28, wherein the carboxylated styrene-butadiene copolymer latex has a content of 0.1 to 5 parts by weight with respect to 100 parts by weight of the hydrogen absorbing alloy.

31. The nickel-hydrogen secondary battery according to claim 28, wherein the metal flakes or the short metal fibers have a content of 0.05 to 5.0 parts by weight with respect to 100 parts by weight of the hydrogen absorbing alloy.

32. The nickel-hydrogen secondary battery according to claim 28, wherein the collector sheet of said negative electrode comprises a punched metal sheet having no holes at an edge portion thereof, and the collector plate is welded to the non-holed edge portion of the punched metal sheet.

33. The nickel-hydrogen secondary battery according to claim 28, wherein the compound of rare-earth element is $Er_2O_3$.

34. The nickel-hydrogen secondary battery according to claim 28, wherein the negative electrode mixture is a dried mixture containing 0.1 to 5.0 parts by weight of carboxylated styrene-butadiene copolymer latex containing 30 to 50 wt % bound butadiene and 60 wt % or more insoluble toluene, 0.05 to 5.0 parts by weight of nickel flakes of short nickel fibers, and 0.05 to 5.0 parts by weight of carbon black, with respect to 100 parts by weight of the hydrogen absorbing alloy.

35. The nickel-hydrogen secondary battery according to claim 28, wherein the metal flakes or the short metal fibers overlap with each other to surround the hydrogen absorbing alloy powder and to have an orientation such that the metal flakes or the short metal fibers connect with each other along their lengths.

36. The nickel-hydrogen secondary battery according to claim 28, wherein the electrically conductive material accounts for between 10% and 30% parts by weight of the negative electrode.

37. The nickel-hydrogen secondary battery according to claim 28, wherein the carboxylated styrene-butadiene copolymer latex is obtained by synthesizing styrene, butadiene and unsaturated ethylene carboxylic acid by emulsion polymerization.

38. A nickel-hydrogen secondary battery comprising:
a positive electrode including a positive electrode mixture which contains a nickel compound as a major component and which is supported on a first collector sheet;
a negative electrode including a negative electrode mixture which contains a hydrogen absorbing alloy as a major component, a binder and an electrically conductive material which is supported on a second collector sheet, said positive electrode and said negative electrode being stacked up alternately or rolled up with a separator interposed therebetween to form an electrode group; and
a battery case containing the electrode group together with an electrolyte, said battery case having an opening closed with a sealing plate which is provided with a positive electrode terminal,
wherein at least an edge portion of the second collector sheet of said negative electrode is electrically connected to said battery case via a collector plate welded to the edge portion of the second collector sheet,
wherein the binder contains at least carboxylated styrene-butadiene copolymer latex, and the electrically conductive material contains metal flakes or short metal fibers, and
wherein the negative electrode mixture is a dried mixture containing 0.1 to 5.0 parts by weight of carboxylated styrene-butadiene copolymer latex containing 30 to 50 wt % bound butadiene and 60 wt % or more insoluble toluene, 0.05 to 5.0 parts by weight of nickel flakes or short nickel fibers, and 0.05 to 5.0 parts by weight of carbon black, with respect to 100 parts by weight of the hydrogen absorbing alloy.

39. The nickel-hydrogen secondary battery according to claim 38, wherein the metal flakes comprise nickel flakes, and the short metal fibers comprise short nickel fibers.

40. The nickel-hydrogen secondary battery according to claim 38, wherein the carboxylated styrene-butadiene copolymer latex has a content of 0.1 to 5 parts by weight with respect to 100 parts by weight of the hydrogen absorbing alloy.

41. The nickel-hydrogen secondary battery according to claim 38, wherein metal flakes or the short metal fibers have a content of 0.05 to 5.0 parts by weight with respect to 100 parts by weight of the hydrogen absorbing alloy.

42. The nickel-hydrogen secondary battery according to claim 38, wherein the collector sheet of said negative electrode comprises a punched metal sheet having no holes at an edge portion thereof, and the collector plate is welded to the non-holed edge portion of the punched metal sheet.

43. The nickel-hydrogen secondary battery according to claim 42, wherein the hydrogen absorbing alloy is surface-treated with acid or alkali.

44. The nickel-hydrogen secondary battery according to claim 38, wherein the metal flakes or the short metal fibers overlap with each other to surround the hydrogen absorbing alloy powder and to have an orientation such that the metal flakes or the short metal fibers connect with each other along their lengths.

45. The nickel-hydrogen secondary battery according to claim 38, wherein the electrically conductive material accounts for between 10% and 30% parts by weight of the negative electrode.

46. The nickel-hydrogen secondary battery according to claim 38, wherein the carboxylated styrene-butadiene copolymer latex is obtained by synthesizing styrene, butadiene and unsaturated ethylene carboxylic acid by emulsion polymerization.

* * * * *